United States Patent
Murray et al.

(10) Patent No.: US 7,783,508 B2
(45) Date of Patent: Aug. 24, 2010

(54) METHOD AND SYSTEM FOR REFINING VENDING OPERATIONS BASED ON WIRELESS DATA

(75) Inventors: Tomás Murray, Atlanta, GA (US); Edward R. Jansson, Canton, GA (US); Edward Irby Comer, Brevard, NC (US); Alexander Nicolaides, Sarasota, FL (US); Juan Manuel Garcia Peralta, Roswell, GA (US)

(73) Assignee: Numerex Corp., Atlanta, GA (US)

( * ) Notice: Subject to any disclaimer, the term of this patent is extended or adjusted under 35 U.S.C. 154(b) by 0 days.

(21) Appl. No.: 10/959,809

(22) Filed: Oct. 6, 2004

(65) Prior Publication Data

US 2005/0043011 A1  Feb. 24, 2005

Related U.S. Application Data

(63) Continuation-in-part of application No. 10/770,326, filed on Feb. 2, 2004, now Pat. No. 7,151,943, which is a continuation of application No. 09/666,042, filed on Sep. 20, 2000, now Pat. No. 6,718,177.

(60) Provisional application No. 60/549,018, filed on Mar. 1, 2004, provisional application No. 60/154,724, filed on Sep. 20, 1999.

(51) Int. Cl.
*G06F 17/60* (2006.01)
(52) U.S. Cl. .............................................. 705/7; 705/10
(58) Field of Classification Search .................... 705/7, 705/10
See application file for complete search history.

(56) References Cited

U.S. PATENT DOCUMENTS

| 3,581,019 A | 5/1971 | Ryan ........................... 179/41 |
| 3,886,515 A | 5/1975 | Cottin et al. .................. 340/23 |
| 3,973,200 A | 8/1976 | Akerberg ...................... 325/55 |
| 4,172,969 A | 10/1979 | Levine et al. ............. 179/2 EC |
| 4,219,698 A | 8/1980 | Birilli et al. ................. 179/5 P |
| 4,263,480 A | 4/1981 | Levine ..................... 179/2 EC |
| 4,284,849 A | 8/1981 | Anderson et al. ........... 179/5 R |

(Continued)

FOREIGN PATENT DOCUMENTS

EP  0 123 456 A2  10/1984

(Continued)

OTHER PUBLICATIONS

Fowler, Tom. ATI resident beta testing vending machine product. Austin Business Journal. Austin: Mar. 26-Apr. 1, 1999. Vo 19, Iss. 4; p. 4, 1 pgs. from proquest.*

(Continued)

*Primary Examiner*—Johnna Loftis
(74) *Attorney, Agent, or Firm*—King & Spalding

(57) ABSTRACT

A system coupled to one or more vending machines, such as soft drink vending machines, via a wireless data link can acquire operational vending data, for example sales data, hardware status, and product temperature. The system can compile data from multiple vending machines dispersed across a geographic area such as a city or state. The system can include software that refines the vending operations of one or more such vending machines based on analysis of acquired data, taking into consideration other information such as market, business, seasonal, or environmental factors. Refining vending operations can include adjusting product offerings, relocating vending machines, replicating favorable conditions, and addressing unexpected sales variations.

33 Claims, 14 Drawing Sheets

U.S. PATENT DOCUMENTS

| | | | |
|---|---|---|---|
| 4,306,219 A * | 12/1981 | Main et al. | 340/10.41 |
| 4,342,986 A | 8/1982 | Buskirk et al. | 340/539 |
| 4,361,730 A | 11/1982 | Barber et al. | 179/5 R |
| 4,371,751 A | 2/1983 | Hilligoss, Jr. et al. | 179/5 R |
| 4,412,292 A * | 10/1983 | Sedam et al. | 700/241 |
| 4,454,027 A | 6/1984 | Fenton | 208/253 |
| 4,486,624 A | 12/1984 | Puhl et al. | 179/2 EB |
| 4,492,820 A | 1/1985 | Kennard et al. | 179/5 P |
| 4,644,347 A | 2/1987 | Lucas et al. | 340/825.04 |
| 4,644,351 A | 2/1987 | Zabarsky et al. | 340/825.44 |
| 4,646,082 A | 2/1987 | Engel et al. | 340/825.54 |
| 4,677,653 A | 6/1987 | Weiner et al. | 379/58 |
| 4,724,425 A | 2/1988 | Gerhart et al. | 340/539 |
| 4,734,928 A | 3/1988 | Weiner et al. | 379/59 |
| 4,750,197 A | 6/1988 | Denekamp et al. | 379/58 |
| 4,766,548 A | 8/1988 | Cedrone et al. | |
| 4,783,747 A * | 11/1988 | Komori et al. | 700/244 |
| 4,791,658 A | 12/1988 | Simon et al. | 379/41 |
| 4,807,225 A | 2/1989 | Fitch | 370/71 |
| 4,814,763 A | 3/1989 | Nelson et al. | 340/825.44 |
| 4,823,123 A | 4/1989 | Siwiak | 340/825.44 |
| 4,825,193 A | 4/1989 | Siwiak et al. | 340/311.1 |
| 4,825,457 A | 4/1989 | Lebowitz | 379/40 |
| 4,833,701 A | 5/1989 | Comroe et al. | 379/60 |
| 4,837,800 A | 6/1989 | Freeburg et al. | 379/59 |
| 4,839,917 A | 6/1989 | Oliver | 379/45 |
| 4,866,445 A | 9/1989 | Valero et al. | 341/106 |
| 4,868,560 A | 9/1989 | Oliwa et al. | 340/825.44 |
| 4,868,859 A | 9/1989 | Sheffer | 379/39 |
| 4,875,038 A | 10/1989 | Siwiak et al. | 340/825.44 |
| 4,875,230 A | 10/1989 | Blair | 379/63 |
| 4,882,579 A | 11/1989 | Siwiak | 340/825.44 |
| 4,887,290 A | 12/1989 | Dop et al. | 379/33 |
| 4,887,291 A | 12/1989 | Stillwell | 379/39 |
| 4,890,315 A | 12/1989 | Bendixen et al. | 379/59 |
| 4,891,637 A | 1/1990 | Siwiak et al. | 340/825.44 |
| 4,891,638 A | 1/1990 | Davis | 340/825.44 |
| 4,901,340 A | 2/1990 | Parker et al. | 379/60 |
| 4,905,234 A | 2/1990 | Childress et al. | 370/94.1 |
| 4,914,651 A | 4/1990 | Lusignan | 370/69.1 |
| 4,928,096 A | 5/1990 | Leonardo et al. | 340/825.44 |
| 4,940,963 A | 7/1990 | Gutman et al. | 340/313 |
| 4,972,460 A | 11/1990 | Sasuta | 379/60 |
| 4,979,169 A | 12/1990 | Almond et al. | 370/99 |
| 4,993,059 A | 2/1991 | Smith et al. | 379/39 |
| 5,005,014 A | 4/1991 | Jasinski | 340/825.44 |
| 5,010,584 A | 4/1991 | Seki | 455/83 |
| 5,020,091 A | 5/1991 | Krolopp et al. | 379/58 |
| 5,020,093 A | 5/1991 | Pireh | 379/59 |
| 5,027,383 A | 6/1991 | Sheffer | 379/39 |
| 5,029,098 A * | 7/1991 | Levasseur | 705/10 |
| 5,031,204 A | 7/1991 | McKernan | 379/63 |
| 5,047,763 A | 9/1991 | Kuznicki et al. | 340/825.44 |
| 5,073,919 A | 12/1991 | Hagensick | 379/29 |
| 5,081,667 A | 1/1992 | Drori et al. | 379/59 |
| 5,087,919 A | 2/1992 | Odagawa et al. | 342/357 |
| 5,090,051 A | 2/1992 | Muppidi et al. | 379/61 |
| 5,117,449 A | 5/1992 | Metroka et al. | 379/58 |
| 5,121,503 A | 6/1992 | Davis | 455/12.1 |
| 5,124,697 A | 6/1992 | Moore | 340/825.44 |
| 5,131,019 A | 7/1992 | Sheffer et al. | 379/39 |
| 5,134,644 A | 7/1992 | Garton et al. | 379/39 |
| 5,142,279 A | 8/1992 | Jasinski et al. | 340/825.44 |
| 5,148,473 A | 9/1992 | Freeland et al. | 379/59 |
| 5,153,582 A | 10/1992 | Davis | 340/825.44 |
| 5,153,902 A | 10/1992 | Buhl et al. | 379/57 |
| 5,153,903 A | 10/1992 | Eastmond et al. | 379/57 |
| 5,159,625 A | 10/1992 | Zicker | 379/59 |
| 5,162,790 A | 11/1992 | Jasinski | 340/825.44 |
| 5,173,933 A | 12/1992 | Jabs et al. | 379/58 |
| 5,175,758 A | 12/1992 | Levanto et al. | 379/57 |
| 5,185,779 A | 2/1993 | Dop et al. | 379/33 |
| 5,196,842 A | 3/1993 | Gomez et al. | 340/825.44 |
| 5,206,855 A | 4/1993 | Schwendeman et al. | 370/50 |
| 5,207,784 A * | 5/1993 | Schwartzendruber | 221/6 |
| 5,208,756 A | 5/1993 | Song | 364/449 |
| 5,210,787 A | 5/1993 | Hayes et al. | 379/60 |
| 5,218,367 A | 6/1993 | Sheffer et al. | 342/457 |
| 5,220,599 A | 6/1993 | Sasano et al. | 379/142 |
| 5,222,123 A | 6/1993 | Brown et al. | 379/57 |
| 5,230,081 A | 7/1993 | Yamada et al. | 455/33.1 |
| 5,239,294 A | 8/1993 | Flanders et al. | 340/825.34 |
| 5,239,678 A | 8/1993 | Grube et al. | 455/34.1 |
| 5,247,567 A | 9/1993 | Hirano | 379/61 |
| 5,254,986 A | 10/1993 | DeLuca | 340/825.44 |
| 5,255,307 A | 10/1993 | Mizikovsky | 379/58 |
| 5,265,150 A | 11/1993 | Helmkamp et al. | 379/58 |
| 5,278,539 A | 1/1994 | Lauterbach et al. | 340/539 |
| 5,278,890 A | 1/1994 | Beeson, Jr. et al. | 379/57 |
| 5,305,217 A | 4/1994 | Nakamura et al. | 364/242.02 |
| 5,307,399 A | 4/1994 | Dai et al. | 379/57 |
| 5,307,509 A | 4/1994 | Michalon et al. | 455/54.1 |
| 5,335,278 A | 8/1994 | Matchett et al. | 380/23 |
| 5,341,410 A | 8/1994 | Aron et al. | 379/59 |
| 5,363,427 A | 11/1994 | Ekstrom et al. | 379/58 |
| 5,365,573 A | 11/1994 | Sakamoto et al. | 379/61 |
| 5,369,681 A | 11/1994 | Boudreau et al. | 379/87 |
| 5,371,781 A | 12/1994 | Ardon | 379/59 |
| 5,371,898 A | 12/1994 | Grube et al. | 455/33.1 |
| 5,382,970 A | 1/1995 | Kiefl | 348/1 |
| 5,386,209 A | 1/1995 | Thomas | 340/539 |
| 5,396,537 A | 3/1995 | Schwendeman | 379/57 |
| 5,396,539 A | 3/1995 | Slekys et al. | 379/59 |
| 5,398,277 A | 3/1995 | Martin, Jr. et al. | 379/39 |
| 5,404,392 A | 4/1995 | Miller et al. | 379/60 |
| 5,432,841 A | 7/1995 | Rimer | 379/59 |
| 5,450,329 A | 9/1995 | Tanner | 364/449 |
| 5,453,730 A | 9/1995 | De-Grinis et al. | |
| 5,454,027 A | 9/1995 | Kennedy et al. | 379/60 |
| 5,493,722 A | 2/1996 | Gunn et al. | 455/54.1 |
| 5,502,761 A | 3/1996 | Duncan et al. | 379/142 |
| 5,511,072 A | 4/1996 | Delprat | 370/68.1 |
| 5,511,110 A | 4/1996 | Drucker | 379/57 |
| 5,517,547 A | 5/1996 | Ladha et al. | 379/40 |
| 5,519,756 A | 5/1996 | Clift | 379/44 |
| 5,526,257 A * | 6/1996 | Lerner | 705/10 |
| 5,526,401 A | 6/1996 | Roach, Jr. et al. | 379/59 |
| 5,528,664 A | 6/1996 | Slekys et al. | 379/58 |
| 5,530,736 A | 6/1996 | Comer et al. | 379/58 |
| 5,533,094 A | 7/1996 | Sanmugam | 379/57 |
| 5,539,810 A | 7/1996 | Kennedy, III et al. | 379/59 |
| 5,544,223 A | 8/1996 | Robbins et al. | 379/58 |
| 5,544,225 A | 8/1996 | Kennedy, III et al. | 379/59 |
| 5,546,444 A | 8/1996 | Roach, Jr. et al. | 379/59 |
| 5,574,975 A | 11/1996 | Hill | 455/51.2 |
| 5,579,372 A | 11/1996 | Åström | 379/58 |
| 5,586,177 A | 12/1996 | Farris et al. | 379/230 |
| 5,594,740 A | 1/1997 | LaDue | 379/59 |
| 5,594,945 A | 1/1997 | Lewis et al. | 455/38.1 |
| 5,596,573 A | 1/1997 | Bertland | 370/474 |
| 5,603,091 A | 2/1997 | Linquist et al. | 455/56.1 |
| 5,610,973 A | 3/1997 | Comer | 379/59 |
| 5,619,209 A | 4/1997 | Horstein et al. | 342/352 |
| 5,625,889 A | 4/1997 | Chikkaswamy et al. | 455/67.1 |
| 5,629,975 A | 5/1997 | Tiedemann, Jr. et al. | 379/60 |
| 5,640,139 A | 6/1997 | Egeberg | 340/426 |
| 5,648,966 A | 7/1997 | Kondo et al. | 370/245 |
| 5,652,564 A | 7/1997 | Winbush | |
| 5,652,570 A | 7/1997 | Lepkofker | 340/573 |
| 5,675,371 A | 10/1997 | Barringer | 348/6 |
| 5,678,179 A | 10/1997 | Turcotte et al. | 455/331 |
| 5,680,551 A | 10/1997 | Martino, II | 395/200.15 |
| 5,684,858 A | 11/1997 | Hartmann et al. | 379/40 |
| 5,686,888 A | 11/1997 | Welles, II et al. | 340/539 |

| Patent | Date | Inventor | Class |
|---|---|---|---|
| 5,701,302 A | 12/1997 | Geiger | 370/521 |
| 5,722,067 A | 2/1998 | Fougnies et al. | 455/406 |
| 5,742,668 A | 4/1998 | Pepe et al. | 379/58 |
| 5,742,905 A | 4/1998 | Pepe et al. | 455/461 |
| 5,745,867 A | 4/1998 | Mills | 701/207 |
| 5,748,104 A | 5/1998 | Argyroudis et al. | 340/870.11 |
| 5,751,789 A | 5/1998 | Farris et al. | 379/34 |
| 5,754,954 A | 5/1998 | Cannon et al. | 455/419 |
| 5,758,313 A | 5/1998 | Shah et al. | 701/208 |
| 5,761,621 A | 6/1998 | Sainton | 455/453 |
| 5,767,788 A | 6/1998 | Ness | 340/825.49 |
| 5,768,343 A | 6/1998 | Dame et al. | 379/33 |
| 5,777,605 A | 7/1998 | Yoshinobu et al. | 345/173 |
| 5,781,612 A | 7/1998 | Choi et al. | 379/58 |
| 5,787,149 A | 7/1998 | Yousefi et al. | 379/59 |
| 5,787,357 A | 7/1998 | Salin | 455/466 |
| 5,790,631 A | 8/1998 | Minarczik et al. | 379/2 |
| 5,793,306 A | 8/1998 | Vershinin et al. | |
| 5,794,144 A | 8/1998 | Comer et al. | 455/426 |
| 5,797,097 A | 8/1998 | Roach, Jr. et al. | 455/456 |
| 5,805,997 A | 9/1998 | Farris | 455/461 |
| 5,819,184 A | 10/1998 | Cashman | 455/553 |
| 5,822,221 A | 10/1998 | Groenteman | 364/550 |
| 5,822,423 A | 10/1998 | Jehnert et al. | 379/352 |
| 5,826,195 A | 10/1998 | Westerlage et al. | 455/456 |
| 5,835,868 A | 11/1998 | McElroy et al. | |
| 5,844,808 A * | 12/1998 | Konsmo et al. | 700/244 |
| 5,845,203 A | 12/1998 | LaDue | 455/414 |
| 5,845,211 A | 12/1998 | Roach, Jr. | 455/436 |
| 5,862,201 A | 1/1999 | Sands | 379/26 |
| 5,862,480 A | 1/1999 | Wild et al. | 455/432 |
| 5,862,481 A | 1/1999 | Kulkarni et al. | 455/432 |
| 5,873,043 A | 2/1999 | Comer | 455/458 |
| 5,875,863 A | 3/1999 | Jarvis et al. | 180/65.4 |
| 5,878,351 A | 3/1999 | Alanara et al. | 455/466 |
| 5,884,216 A | 3/1999 | Shah et al. | 701/207 |
| 5,889,474 A | 3/1999 | LaDue | 340/825.49 |
| 5,898,917 A | 4/1999 | Batni et al. | 455/564 |
| 5,901,142 A | 5/1999 | Averbuch et al. | 370/329 |
| 5,909,651 A | 6/1999 | Chander et al. | 455/466 |
| 5,913,166 A | 6/1999 | Buttitta et al. | 455/436 |
| 5,917,449 A | 6/1999 | Sanderford et al. | 342/457 |
| 5,917,886 A | 6/1999 | Halkio | 379/37 |
| 5,918,172 A | 6/1999 | Saunders et al. | 455/404 |
| 5,920,822 A | 7/1999 | Houde et al. | 455/466 |
| 5,923,731 A | 7/1999 | McClure | |
| 5,924,026 A | 7/1999 | Krishnan | 455/414 |
| 5,933,784 A | 8/1999 | Gallagher et al. | 455/552 |
| 5,946,629 A | 8/1999 | Sawyer et al. | 455/466 |
| 5,946,630 A | 8/1999 | Willars et al. | 455/466 |
| 5,983,197 A * | 11/1999 | Enta | 705/16 |
| 5,999,808 A | 12/1999 | LaDue | 455/412 |
| 6,011,321 A | 1/2000 | Stancu et al. | |
| 6,012,013 A | 1/2000 | McBurney | 701/207 |
| 6,012,014 A | 1/2000 | Koyanagi et al. | 701/208 |
| 6,014,089 A | 1/2000 | Tracy et al. | 340/870.02 |
| 6,018,657 A | 1/2000 | Kennedy, III et al. | 455/426 |
| 6,021,394 A * | 2/2000 | Takahashi | 705/10 |
| 6,025,774 A | 2/2000 | Forbes | 340/426 |
| 6,026,345 A | 2/2000 | Shah et al. | 701/117 |
| 6,049,273 A | 4/2000 | Hess | 340/539 |
| 6,067,454 A | 5/2000 | Foti | 455/433 |
| 6,070,070 A | 5/2000 | Ladue | 455/419 |
| 6,072,862 A | 6/2000 | Srinivasan | 379/100.08 |
| 6,078,811 A | 6/2000 | Lin et al. | 455/433 |
| 6,078,820 A | 6/2000 | Wells et al. | 455/466 |
| 6,081,514 A | 6/2000 | Raith | 370/321 |
| 6,081,546 A | 6/2000 | Williamson et al. | 375/33 |
| 6,088,431 A | 7/2000 | LaDue | 379/114 |
| 6,094,578 A | 7/2000 | Purcell et al. | 455/426 |
| 6,097,951 A | 8/2000 | Ernam et al. | 455/433 |
| 6,108,537 A | 8/2000 | Comer et al. | 455/426 |
| 6,108,540 A | 8/2000 | Sonti et al. | 455/433 |
| 6,111,539 A | 8/2000 | Mannings et al. | 342/357.09 |
| 6,122,514 A | 9/2000 | Spaur et al. | 455/448 |
| 6,125,275 A | 9/2000 | Comer et al. | 455/426 |
| 6,138,034 A | 10/2000 | Willey | 455/522 |
| 6,144,722 A | 11/2000 | Anderson et al. | 379/27 |
| 6,144,859 A | 11/2000 | LaDue | 455/511 |
| 6,148,202 A | 11/2000 | Wortham | 455/434 |
| 6,150,955 A | 11/2000 | Tracy et al. | 340/870.02 |
| 6,151,507 A | 11/2000 | Laiho et al. | 455/466 |
| 6,154,648 A | 11/2000 | Comer | 455/426 |
| 6,154,658 A | 11/2000 | Caci | 455/466 |
| 6,161,020 A | 12/2000 | Kim | 455/466 |
| 6,163,701 A | 12/2000 | Saleh et al. | 455/456 |
| 6,169,895 B1 | 1/2001 | Buhrmann et al. | 455/423 |
| 6,175,732 B1 | 1/2001 | McDaniel et al. | 455/433 |
| 6,181,981 B1 * | 1/2001 | Varga et al. | 700/236 |
| 6,185,198 B1 | 2/2001 | LaDue | 370/329 |
| 6,195,546 B1 | 2/2001 | Leung et al. | 455/419 |
| 6,215,404 B1 | 4/2001 | Morales | 340/577 |
| 6,230,150 B1 * | 5/2001 | Walker et al. | 705/400 |
| 6,233,450 B1 | 5/2001 | Seppanen | 455/426 |
| 6,236,357 B1 | 5/2001 | Corwith | 342/357.08 |
| 6,249,217 B1 | 6/2001 | Forbes | 340/426 |
| 6,259,781 B1 | 7/2001 | Crouch et al. | 379/207 |
| 6,263,212 B1 | 7/2001 | Ross et al. | 455/466 |
| 6,282,496 B1 | 8/2001 | Chowdhary | 701/220 |
| 6,285,868 B1 | 9/2001 | LaDue | 455/410 |
| 6,285,953 B1 | 9/2001 | Harrison et al. | 701/213 |
| 6,292,669 B1 | 9/2001 | Meuronen et al. | 455/466 |
| 6,297,768 B1 | 10/2001 | Allen, Jr. | 342/357.1 |
| 6,298,232 B1 | 10/2001 | Marin et al. | 455/413 |
| 6,311,056 B1 | 10/2001 | Sandidge | 455/414 |
| 6,311,060 B1 | 10/2001 | Evans et al. | 455/426 |
| 6,330,452 B1 | 12/2001 | Fattouche et al. | 455/456 |
| 6,339,731 B1 * | 1/2002 | Morris et al. | 700/236 |
| 6,353,743 B1 | 3/2002 | Karmel | 455/456 |
| 6,353,745 B1 | 3/2002 | Wehrend et al. | 455/466 |
| 6,363,249 B1 | 3/2002 | Nordeman et al. | 455/418 |
| 6,363,254 B1 | 3/2002 | Jones et al. | 455/456 |
| 6,363,324 B1 | 3/2002 | Hildebrant | 701/213 |
| 6,366,791 B1 | 4/2002 | Lin et al. | |
| 6,369,719 B1 | 4/2002 | Tracy et al. | 340/870.02 |
| 6,370,135 B1 | 4/2002 | Gardner | 370/352 |
| 6,377,210 B1 | 4/2002 | Moore | 342/357.13 |
| 6,389,289 B1 | 5/2002 | Voce et al. | 455/456 |
| 6,393,295 B1 | 5/2002 | Butler et al. | 455/458 |
| 6,397,056 B1 | 5/2002 | Bugnon et al. | 455/411 |
| 6,405,033 B1 | 6/2002 | Kennedy, III et al. | 455/414 |
| 6,424,828 B1 | 7/2002 | Collins et al. | 455/412 |
| 6,424,841 B1 | 7/2002 | Gustafsson | 455/466 |
| 6,430,268 B1 * | 8/2002 | Petite | 379/39 |
| 6,457,038 B1 * | 9/2002 | Defosse | 709/200 |
| 6,476,763 B2 | 11/2002 | Allen, Jr. | 342/357.1 |
| 6,484,035 B2 | 11/2002 | Allen, Jr. | 455/456 |
| 6,487,602 B1 | 11/2002 | Thakker | 709/230 |
| 6,493,556 B1 | 12/2002 | Stinson | 455/445 |
| 6,493,558 B1 | 12/2002 | Bernhart et al. | 455/466 |
| 6,498,965 B2 * | 12/2002 | Matsumoto et al. | 700/231 |
| 6,515,997 B1 | 2/2003 | Feltner et al. | 370/401 |
| 6,516,197 B2 | 2/2003 | Havinis et al. | |
| 6,553,336 B1 * | 4/2003 | Johnson et al. | 702/188 |
| 6,560,456 B1 | 5/2003 | Lohtia et al. | 455/445 |
| 6,567,501 B1 | 5/2003 | Pernu et al. | |
| 6,570,532 B2 | 5/2003 | Mise et al. | 342/357.1 |
| 6,571,150 B2 * | 5/2003 | Arai et al. | 700/236 |
| 6,608,553 B2 | 8/2003 | Isobe | |
| 6,618,671 B2 | 9/2003 | Dooley et al. | 701/213 |
| 6,622,016 B1 | 9/2003 | Sladek et al. | 455/414 |
| 6,625,461 B1 | 9/2003 | Bertacchi | 455/466 |
| 6,643,511 B1 | 11/2003 | Rune et al. | |
| 6,665,532 B1 | 12/2003 | Boland et al. | |
| 6,683,881 B1 | 1/2004 | Mijares et al. | |
| 6,710,738 B2 | 3/2004 | Allen, Jr. | 342/357.1 |

| | | | | | | |
|---|---|---|---|---|---|---|
| 6,714,793 B1 | 3/2004 | Carey et al. ............... 455/466 | | WO | WO 94/05095 A1 | 3/1994 |
| 6,718,177 B1 | 4/2004 | Comer et al. ............ 455/458 | | WO | WO 95/24791 A1 | 9/1995 |
| 6,718,237 B1 | 4/2004 | Murray et al. ............. 701/24 | | WO | WO 95/25407 A1 | 9/1995 |
| 6,738,647 B1 | 5/2004 | Link, II ................... 455/564 | | WO | WO 95/26088 A1 | 9/1995 |
| 6,741,853 B1 | 5/2004 | Jiang et al. ............... 455/418 | | WO | WO 96/03007 A1 | 2/1996 |
| 6,741,863 B1 | 5/2004 | Chiang et al. | | WO | WO 96/10895 A1 | 4/1996 |
| 6,745,041 B2 | 6/2004 | Allison et al. ............. 455/466 | | WO | WO 96/37079 A1 | 11/1996 |
| 6,760,580 B2 | 7/2004 | Robinson et al. ......... 455/412.2 | | WO | WO 96/38989 A1 | 12/1996 |
| 6,771,949 B1 | 8/2004 | Corliss ................... 455/413 | | WO | WO 97/36435 A1 | 10/1997 |
| 6,782,276 B1 | 8/2004 | Lam et al. ................ 455/560 | | WO | WO 97/38540 A1 | 10/1997 |
| 6,826,397 B1 | 11/2004 | Vasa | | WO | WO 97/45991 A2 | 12/1997 |
| 6,856,808 B1 | 2/2005 | Comer et al. ............. 455/466 | | WO | WO 98/06227 A2 | 2/1998 |
| 6,861,947 B2 | 3/2005 | Albert | | WO | WO/98/19438 A1 | 5/1998 |
| 6,865,191 B1 | 3/2005 | Bengtsson et al. ......... 370/475 | | WO | WO 98/19447 A1 | 5/1998 |
| 6,882,843 B1 | 4/2005 | Comer ..................... 455/445 | | WO | WO 98/27780 A2 | 6/1998 |
| 6,959,192 B1 | 10/2005 | Cannon et al. | | WO | WO 99/26428 A1 | 5/1999 |
| 6,980,887 B2 * | 12/2005 | Varga et al. ............... 700/236 | | WO | WO 99/60769 A1 | 11/1999 |
| 6,982,656 B1 | 1/2006 | Coppinger et al. | | WO | WO 00/03532 A2 | 1/2000 |
| 7,005,997 B1 | 2/2006 | Wiewiura | | WO | WO 00/17021 A1 | 3/2000 |
| 7,010,306 B1 | 3/2006 | Tanibayashi et al. | | WO | WO 00/28347 A1 | 5/2000 |
| 7,089,322 B1 * | 8/2006 | Stallmann .................. 709/238 | | WO | WO 00/36812 A1 | 6/2000 |
| 7,711,658 B2 * | 5/2010 | Tedesco et al. ............. 705/400 | | WO | WO 01/63825 A2 | 8/2001 |
| 2001/0003093 A1 | 6/2001 | Lundin ..................... 455/456 | | WO | WO 01/63960 A1 | 8/2001 |
| 2001/0042121 A1 | 11/2001 | Defosse et al. | | WO | WO 01/72068 A1 | 9/2001 |
| 2001/0047244 A1 | 11/2001 | Harrison et al. ............ 701/213 | | WO | WO 01/80583 A2 | 10/2001 |
| 2001/0047410 A1 | 11/2001 | Defosse | | WO | WO 02/35866 A2 | 5/2002 |
| 2001/0054083 A1 | 12/2001 | Defosse | | WO | WO 03/019925 A2 | 3/2003 |
| 2002/0016829 A1 | 2/2002 | Defosse | | WO | WO 2005/074430 A2 | 8/2005 |
| 2002/0065579 A1 * | 5/2002 | Tedesco et al. ............. 700/238 | | WO | WO 2006/014419 A1 | 2/2006 |
| 2002/0086636 A1 | 7/2002 | Tracy et al. ............... 455/3.01 | | | | |
| 2002/0110230 A1 | 8/2002 | Leuca et al. ........... 379/201.01 | | | | |
| 2002/0120728 A1 | 8/2002 | Braatz et al. | | | | |
| 2002/0142759 A1 | 10/2002 | Newell et al. | | | | |
| 2002/0155844 A1 | 10/2002 | Rankin et al. ............. 455/456 | | | | |
| 2002/0160771 A1 | 10/2002 | Massie et al. ............. 455/426 | | | | |
| 2002/0164988 A1 | 11/2002 | Vishwanathan et al. ..... 455/445 | | | | |
| 2002/0194387 A1 | 12/2002 | Defosse | | | | |
| 2002/0196924 A1 | 12/2002 | Dahari .................. 379/220.01 | | | | |
| 2003/0003930 A1 | 1/2003 | Allison et al. ............. 455/466 | | | | |
| 2003/0009313 A1 | 1/2003 | May et al. ................. 702/188 | | | | |
| 2003/0021273 A1 | 1/2003 | Fouquet et al. ............. 370/392 | | | | |
| 2003/0022656 A1 | 1/2003 | Hinnant, Jr. et al. ......... 455/410 | | | | |
| 2003/0054830 A1 | 3/2003 | Williams et al. ............ 455/456 | | | | |
| 2003/0097474 A1 | 5/2003 | Defosse et al. | | | | |
| 2003/0101257 A1 | 5/2003 | Godwin | | | | |
| 2003/0101262 A1 | 5/2003 | Godwin | | | | |
| 2003/0119489 A1 | 6/2003 | Mohammed | | | | |
| 2003/0119498 A1 | 6/2003 | Haas et al. ................. 455/426 | | | | |
| 2003/0129969 A1 | 7/2003 | Rucinski ................... 455/412 | | | | |
| 2003/0141990 A1 | 7/2003 | Coon | | | | |
| 2003/0158650 A1 | 8/2003 | Abe et al. | | | | |
| 2003/0182053 A1 | 9/2003 | Swope et al. | | | | |
| 2003/0204391 A1 | 10/2003 | May et al. | | | | |
| 2004/0029598 A1 | 2/2004 | Guggisberg ................ 455/466 | | | | |
| 2004/0110493 A1 | 6/2004 | Alvarez et al. ............ 455/414.1 | | | | |
| 2004/0142707 A1 | 7/2004 | Midkiff et al. .............. 455/466 | | | | |
| 2004/0180678 A1 | 9/2004 | Smith et al. ................ 455/466 | | | | |
| 2004/0203640 A1 | 10/2004 | Molander et al. ......... 455/414.1 | | | | |
| 2005/0037784 A1 | 2/2005 | Cleary ..................... 455/466 | | | | |
| 2005/0102074 A1 | 5/2005 | Kolls | | | | |
| 2005/0197106 A1 | 9/2005 | Bristow et al. | | | | |

FOREIGN PATENT DOCUMENTS

| | | |
|---|---|---|
| EP | 0 123 562 B1 | 7/1990 |
| EP | 0 345 818 B1 | 12/1996 |
| EP | 0 837 341 A1 | 4/1998 |
| EP | 0 855 824 A2 | 7/1998 |
| EP | 0 924 918 A2 | 6/1999 |
| EP | 0 959 600 A1 | 11/1999 |
| GB | 2 363 289 A | 12/2001 |
| JP | 4-96509 | 3/1992 |
| WO | WO 92/14329 A1 | 8/1992 |

OTHER PUBLICATIONS

McKie, Robin. The Observer. London (UK): May 2, 1999..p. 006. from proquest.*

Vending Machine Operators Improve Bottom Line Through Wireless Monitoring. Business & Technology Editors. Business Wire. New York: Mar. 8, 1999. p. 1 from proquest.*

A user-friendly information utlity. Beverage World; Oct. 1996; 115, 1625; ABI/INFORM Global p. 72.*

Cherkassky, Irene. The e-voluation of wireless vending. Beverage World; Feb. 15, 2000; 119, 1687; ABI/INFORM Global p. 55.*

Violino, Bob. Coke machines get smarter. Information Week; Mar. 22, 1999; 726; ABI/INFORM Global p. 63.*

Edwards, John G. Vending machines go cellular. Las Vegas Review—Journal. Las Vegas, Nev.: Oct. 13, 1996. p. 1 from proquest.*

Sfiligoj, Eric. Remote Control. Beverage World; Aug. 1996; 115, 1621; ABI/INFORM Global p. 50.*

A Vending Machine on Every Street Corner. Beverage Industry, p. 20. Jan. 1994.*

Raudabaugh, Joseph. Opportunities for customer segmentation strategies. Planning Review, v22n6, p. 36-38 Nov./Dec. 1994.*

Veteran telecard vendors offer detailed look at major market niches. Vending Times, p. 65. Apr. 25, 1999.*

EIA/TIA IS-54-B Standard; p. 115 and pp. 215-222.

European Telecommunication Standards Institute; *European Digital Cellular Telecommunications System (Phase 2); Technical Realization of the Short Message Service (SMS) Point to Point (PP) (GSM 03.40)*; European Telecommunication Standard; Oct. 1993; Draft pr ETS 300 536; pp. 1-103.

European Telecommunication Standards Institute; *European Digital Cellular Telecommunications System (Phase 2); Technical Realization of Short Message Service Call Broadcast (SMSCB) (GSM 03.41)*; European Telecommunication Standard; Oct. 1993; Draft pr ETS 300 537; pp. 1-24.

funSMS.net; *SMS Tutorial*; pp. 1-17; http://www.funsms.net/sms_tutorial.htm.

Isochron Data Corporation; *Connect With Your Vending Machines—and Watch Your Profits Soar*; www.isochron.com/solutions_VC.htm; (2002); pp. 1-2.

Lee, William C. Y.; *Mobile Cellular Telecommunications Systems*; ISBN 0-07-037030-3; 1989; pp. 74-80.

Mouly et al.; *The GSM System for Mobile Communications*; ISBN: 2-9507190-0-7; © 1992; pp. 56-59.

TIA/EIA IS-41.5-C Standard; pp. 24, 65, 206, 207.

\* cited by examiner

METHOD AND SYSTEM FOR REFINING VENDING OPERATIONS BASED ON WIRELESS DATA

RELATED APPLICATIONS

This application claims the benefit of priority to U.S. Provisional Patent Application Ser. No. 60/549,018, entitled "Method and System for Communicating Vending Information" and filed Mar. 1, 2004. The subject matter of U.S. Provisional Patent Application Ser. No. 60/549,018 is hereby incorporated by reference.

This application is a continuation in part of U.S. patent application Ser. No. 10/770,326, entitled "System for Communicating Messages via a Forward Overhead Control Channel for a Programmable Logic Control Device" and filed Feb. 2, 2004 now U.S. Pat. No. 7,151,943, which is a continuation of U.S. patent application Ser. No. 09/666,042, filed Sep. 20, 2000, now U.S. Pat. No. 6,718,177, which claims priority to U.S. Provisional Patent Application Ser. No. 60/154,724, filed on Sep. 20, 1999. The subject matter of U.S. patent application Ser. No. 10/770,326, U.S. patent application Ser. No. 09/666,042, and U.S. Provisional Patent Application Ser. No. 60/154,724 is hereby incorporated by reference.

TECHNICAL FIELD

The present invention relates to collecting information from one or more vending machines, such as soft drink vending machines, via a wireless network and more specifically to refining operations of one or more vending machines based on information collected over a wireless network.

BACKGROUND OF THE INVENTION

Organizations such as soft drink bottlers that distribute soft drinks or other products via vending machines typically operate these vending machines at geographically dispersed locations. Soft drink bottlers often distribute a variety of soft drink products to a city, region, or other area through a system or network of vending machines. A bottler may locate these vending machines at storefronts, building lobbies, neighborhood parks, movie theaters, beaches, or various other locations having requisite connectivity to an electrical power utility.

Preferred vending machine locations usually provide a robust flow of potential customers in the vicinity of the vending machine. The traffic of potential customers at certain locations is often more receptive to purchasing vending machine products than the traffic at other locations. For example, a soft drink vending machine located near a hot sports park might vend more soft drinks than a similar vending machine located in an air conditioned lobby. However, numerous factors may contribute to the relative performance impact of a vending machine's location. Representative factors can include the affluence of the potential customers that frequent the location, ambient temperature, nearby recreational activities, stability of the electrical power utility, competitive or complementary product offerings in nearby business outlets, environmental setting, nearby fixtures such as an adjacent bench, as well as numerous other known or unknown factors. The impact of location on the profitability of a vending machine provides a motivation for a vending machine operator to select locations that deliver strong financial results. However, selecting a financially rewarding location for a vending machine with little or no observed data, a priori, is often difficult based on conventional selection methods.

The factors affecting the desirability of a vending machine's location can be numerous and convoluted. Furthermore, the operational environment of a vending machine can be dynamic, varying with season, advertising campaigns, weather, competitive product introductions, and numerous other influences. In other words, a soft drink bottler or other vending machine operator has a limited ability to select vending machine locations that are likely to yield strong financial results using conventional selection methods. Conventional methods for selecting vending machine locations typically lack timely input to dynamic vending data and further lack a capability to consider multiple, interrelated factors associated with a vending machine's performance.

When the performance of a vending machine at a specific location changes, conventional vending machine operations often cannot readily identify the cause of the change and respond accordingly. If performance of a specific vending machine declines, implementing timely corrective measures would financially benefit operations. On the other hand, replicating conditions that caused a performance increase in a specific vending machine would also have a positive financial impact. However, conventional methods of managing vending machine operations typically do not aggregate information from each vending machine in a timely manner or process such information in a manner that can sufficiently correlate cause and effect to facilitate responsive action that is prompt and effective.

In addition to the overall vending performance of each vending machine, vending machine operations are also concerned with the mix of products that each vending machine offers and the stocking levels of these product offerings in each vending machine. The relative performance of each product offering in a vending machine usually depends upon numerous factors. Marketing-related influences include the occurrence of sales promotions, marketing campaigns, advertisements, and tie-ins to complementary events. Competitive influences can include the introduction of competitive products in nearby vending machines, competitive marketing campaigns, and price wars. Season can also significantly impact a product's relative contribution to total sales of a vending machine. For example, sport drink sales may increase in hot months and decline in colder times. Oftentimes, a change in product sales is not easily attributable to one or more specific causes. While the occurrence of certain events effecting vending performance are known in advance, other events can occur randomly and are not easily foreseen.

Vending machine operators have a financial motive to stock each vending machine with a mix of products that generates a high number of vends and a corresponding level of profit. However, conventional technology for tracking the sales of each product in each vending machine in a system of geographically dispersed vending machines often lacks sufficient specificity and detail to enable a vending machine operator to effectively adjust this product mix to respond to the dynamic environment in which vending machines frequently operate. Furthermore, conventional technologies for aggregating product-specific vending data from multiple vending machines and for analyzing such aggregated data generally cannot recommend product offerings in each vending machine in a geographically dispersed system of vending machines.

To address these representative deficiencies in the art, what is needed is a capability for collecting timely data from each vending machine in a system of vending machines, processing the collected data, and adjusting operational aspects of the vending machines based on the processed data. Such capabilities would benefit vending machine operators, such as soft drink bottlers, by promoting operational efficiency and enhancing profitability.

SUMMARY OF THE INVENTION

The present invention supports adjusting one or more operational aspects of a vending machine, such as a soft drink vending machine, based on collecting data from the vending machine via a wireless network. In one aspect of the present invention, each vending machine in a system of geographically dispersed vending machines can have a wireless link to a central data processing center via a system for communicating operational data specific to that vending machine. That is, a data processing center can receive operational data originating throughout a system of vending machines via a wireless communication network. Operational data can include the number and type of the products sold through each vending machine during a time period. Operational data from each vending machine can also include sensor inputs such as temperature, power failure, and hardware status. The data processing center can process or analyze data acquired via the wireless communication network and can provide or recommend adjustments to vending machine operations based on such processing or analysis. Processing and analysis can include compiling data from multiple vending machines, tracking historical sales patterns, and statistical analysis.

In another aspect of the present invention, a data processing center can adjust the operations of one or more of the vending machines based not only on data collected from the vending machines but also on information from other sources such as sources of market and competitor information having an impact on vending operations. For example, the data processing center can consider a vendor's market plans and promotional programs, a competitor's activities and position, economic factors, weather conditions, or the season of the year in determining an operational adjustment. Taking into account business, environmental, or similar information into adjusting vending operations can facilitate refining vending operations by making specific adjustments that are likely to yield desirable results. That is, software in the data processing center can account for multiple factors that affect vending machine operations and can analyze the contributions of these factors to refine the operations based on the pertinent factors.

The output of the data center's processing can be a recommendation that a vendor or a manager of a vending machine operation can implement by directing personnel to execute operational changes, redeploying resources, changing business initiatives, or via other managerial action. Alternatively, automatic systems at the data processing center can directly control a vending machine operation, with or without human oversight. For example, a purchasing system can purchase specific products under the direction of an automatic system, which can also issue product stocking specifications for each vending machine.

In another aspect of the present invention, a system coupled to a vending machine via a wireless link can detect a variation in performance of the vending machine, for example a change in the vending machine's sales rate. If sales have declined, a computer-implemented process can facilitate isolating the source of the decline to enable corrective action. If sales have increased, a computer-implemented process can facilitate identifying the cause of the increase and, if warranted, inducing a similar increase in other vending machines.

In yet another aspect of the present invention, a process can refine the product offerings and stocking levels in a vending machine based on data acquired from the vending machine via a wireless data link. In response to dynamic conditions, the process can replace underperforming products with products that generate strong sales and corresponding profit.

In yet another aspect of the present invention, a wireless communication system can include a program that tracks the performance of each vending machine in a system of vending machines at dispersed locations. The program can identify preferential vending machine locations based on the performance of each machine in the system. For underperforming vending machines, the program can specify relocation sites likely to provide improved performance.

The discussion of vending machine operations presented in this summary is for illustrative purposes only. Various aspects of the present invention may be more clearly understood and appreciated from a review of the following detailed description of the disclosed embodiments and by reference to the drawings and claims.

DETAILED DESCRIPTION OF EXEMPLARY EMBODIMENTS

The present invention is directed to managing operations of a vending machine or a system of vending machines based on vending machine data acquired via a wireless data link.

Turning now to discuss each of the drawings presented in FIGS. 1-11, in which like numerals indicate like elements throughout the several figures, an exemplary embodiment of the present invention will be described in detail.

Figure 1:
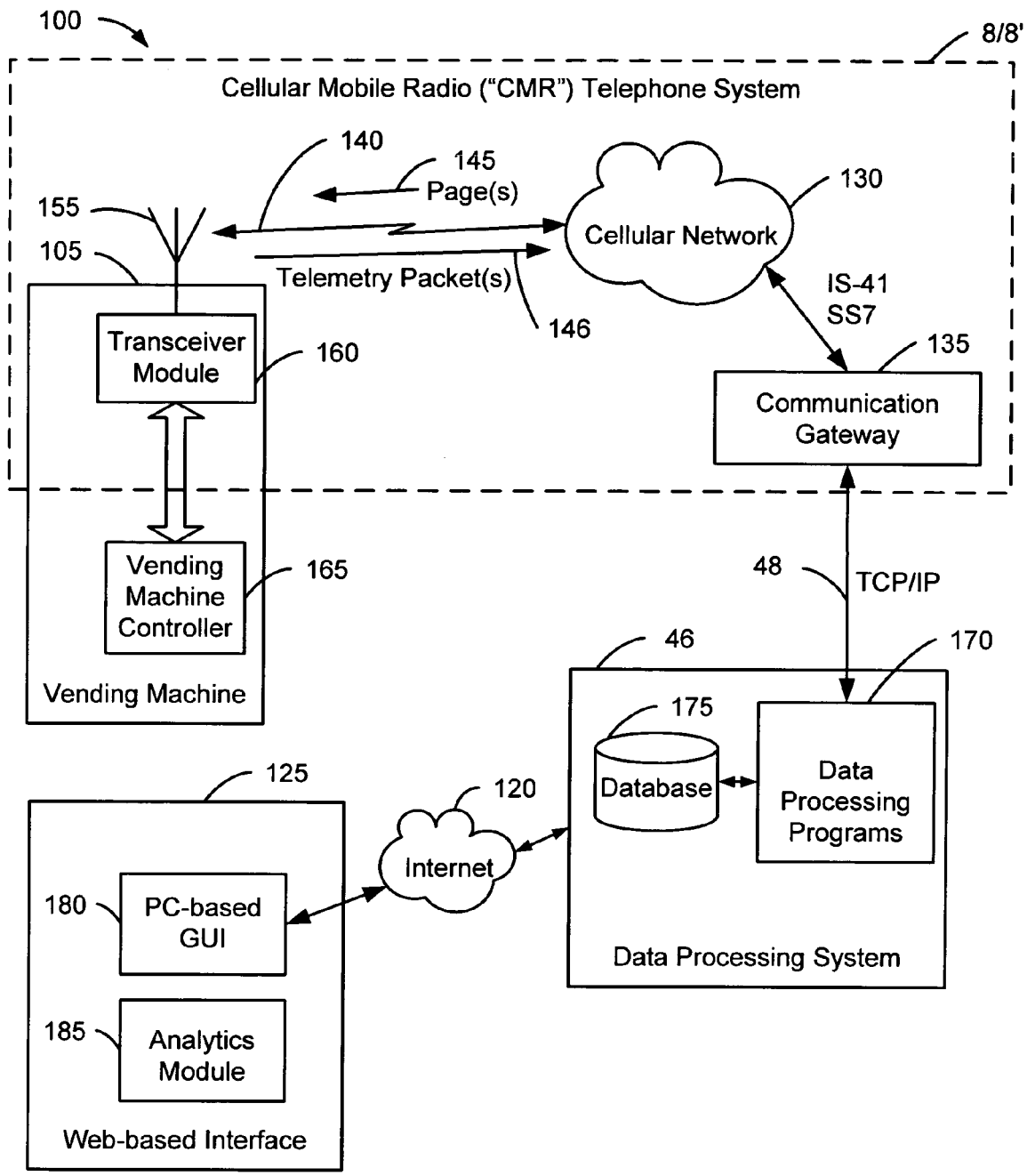
FIG. 1 is a functional block diagram illustrating a cellular-based system for wireless communication with one or more vending machines according to an exemplary embodiment of the present invention.

Referring now to FIG. 1, this figure is a functional block diagram illustrating a cellular-based system 100 for wireless communication with one or more vending machines 105 according to an exemplary embodiment of the present invention. In the case of multiple vending machines 105, only one of which FIG. 1 illustrates, the vending machines 105 are typically dispersed across a geographic area, such as a city, portion of a city, region, state, or larger area. A business entity such as a soft drink bottler typically operates the vending machines 105, manages various business activities associated with the vending machines 105, and receives operational profit. Such a vending machine operator may employ service providers to assist in vending operations and have business relationships with other organizations involved with vending soft drinks or other products. Using wirelessly aggregated information, this vending management system 100 supports remote and automated refinement of multiple aspects of managing a vending operation.

Each vending machine 105 has a microprocessor-based vending machine controller 165 that controls the equipment of the vending machine 105, including dispensing products, maintaining a specified temperature, tracking inventory, and sales accounting. In one exemplary embodiment of the present invention, the vending machine controller 165 is a programmable logic control device or a controller device. A transceiver module 160 and its associated antenna 155 in each vending machine 105 communicate data to and from the vending machine controller 165 over a wireless link 140 in a cellular mobile radiotelephone ("CMR") system 8. In one exemplary embodiment of the present invention, the vending machine controller 165 and the transceiver module 160 function together as a programmable logic control device or a controller device. In one exemplary embodiment of the present invention, the transceiver module 160 functions as a programmable logic control device or a controller device.

The CMR system 8 includes a cellular network 130 that supports wireless communication between a communication gateway 135 and the transceiver module 160. Communication 145 in the CMR system 8 from the communication gateway 135 to the transceiver module 160 transmits in the cellular network's paging channel. Communication 146 from the transceiver module 160 to the communication gateway 135 transmits in the cellular network's control channel.

Communicating data to and from vending machines 105 in cellular paging and control channels preserves the CMR system's communication bandwidth for other communication functions. Thus, the data processing system 46 depicted in FIG. 1 can support multiple communication applications in tandem with vending machine communication, as described below in reference to FIGS. 3A, 3B, and 4. A single CMR system 8 can carry voice communication while carrying data communications associated with vending machines 105 and a variety of other equipment (not shown in FIG. 1). Stated another way, the depicted communication system 100 provides economical two-way communications between remote equipment and a central facility using an underutilized portion of an advanced mobile phone system ("AMPS") cellular telephone system, the overhead control channels.

In one exemplary embodiment of the present invention, a system other than an AMPS cellular telephone system conveys data from the vending machine 105 to the data processing system 46. Such a non-AMPS system can be either a cellular or a non-cellular system based on various transmission protocols. In one exemplary embodiment of the present invention, communication between the vending machine 105 and the data processing system 46 comprises digital transmission or short message service ("SMS") transport.

The communication system 100 can comprise Digital AMPS (DAMPS), Code Division Multiple Access (CDMA/IS-95), Time Division Multiple Access (TDMA/IS-136), the Global System for Mobile communications (GSM), Enhanced Data Rates for Global Evolution (EDGE), General Packet Radio Service (GPRS), and various two-way paging protocols. The wireless transport can support a data capacity of 8,000 bits per second or more. In one exemplary embodiment of the present invention, the communication system 100 is based on the communication platform marketed by Numerex Corp. of Atlanta, Ga. under the registered trademark CELLEMETRY and can have an uplink payload size of 32 bits. In one exemplary embodiment of the present invention, the communication system 100 comprises a satellite data link, such as provided by the GlobalWave® system that is available from Vistar Datacomm, and can have an uplink payload size of 88 bits. In one exemplary embodiment of the present invention, the communication system 100 is linked to the MicroBurst® communication service from Aeris.net of San Jose, Calif.

The transceiver module 160 sends information acquired from the vending machine controller 165 and other data sources in the vending machine 105 as telemetry packets 146 through the cellular network's control channel to the communication gateway 135. In one exemplary embodiment of the present invention, each telemetry packet 146 comprises a 32-bit word or has a 32-bit word payload. However, each telemetry packet can have a larger payload such as a payload in a range of 32 to 300 bytes. In one exemplary embodiment of the present invention, each telemetry packet comprises 88 bits.

The transceiver module 160 receives data communicated in the form of incoming pages 145 transmitted over the cellular network 130. Pages 145 received by the transceiver module 160 can include commands, programming, and configuration data. These pages 145 can include requests for transmission of sales and inventory data from the vending machine 105 or a daily time setting for the vending machine 105 to autonomously upload data, for example.

Communication between the communication gateway 135 and the cellular network 130 can conform to any one of a variety of communication protocols such as Signaling System 7 ("SS7") and Interim Standard 41 ("IS-41"). SS7 is a communications protocol historically used to transfer public switched telephone network data traffic onto a separate wireline or wireless network rather than the originating network for the call. IS-41, as will be discussed in further detail below, is a standard for communications between cellular systems.

A data processing system 46, typically collocated with the communication gateway 135, communicates with this gateway 135 via transmission control protocol and Internet protocol ("TCP/IP") over a hardwire data link 48. TCP/IP is a communication method that combines TCP and IP functions. While IP handles data delivery, TCP tracks packets, which are units of data, divided for efficient routing through a communication network, such as the Internet 120. More specifically, TCP provides a transport function that matches the message sizes on either end of a communication link and thereby ensures that messages received at a destination are the correct messages intended for that destination. The IP function includes a computer address on a network. Each computer in a TCP/IP network has a specified address that may be permanently assigned or reassigned at each startup. Since TCP/IP messages contain an address of a destination network as well as an address of a destination station on the destination network, TCP/IP messages readily transmit across or between multiple networks, such as the Internet 120 and the cellular network 130 of the vending management system 100 depicted in FIG. 1.

The data processing system 46 includes a database 175 that stores raw and processed data acquired from vending machines 105. Data processing programs 170 linked to the database 175 process incoming data as well as data archived in the database 175.

A connection of the data processing system 46 to the Internet 120 facilitates locating a web-based interface 125 for remote user interaction with the data processing system 46 as well as the other components of the vending management system 100. The web-based interface 125 includes a PC-based graphical user interface ("GUI") 180 though which a user enters data, requests information, performs other input-related interactions, and views displayed data, operational recommendations, and other information. The web-based interface 125 further includes an analytics module 185 that performs high-level data processing in collaboration with the data processing programs 170 of the data processing system 46. The analytics module 185 outputs recommendations to the user for managing a vending machine operation.

While the exemplary system architecture depicted in FIG. 1 supports remotely locating the web-based interface 125 with respect to the data processing system 46, these system components 125, 46 can be located in a common facility, building, or complex or in a single equipment enclosure. In one exemplary embodiment of the present invention, the depicted Internet network 120 is replaced with an intranet that communicates information within a campus and thus offers access to the data processing system 46 and the functions of the analytics module 185 to users throughout the campus. In one exemplary embodiment of the present invention, a distributed computing network links the web-based interface 125 to the data processing system 46.

Figure 2:
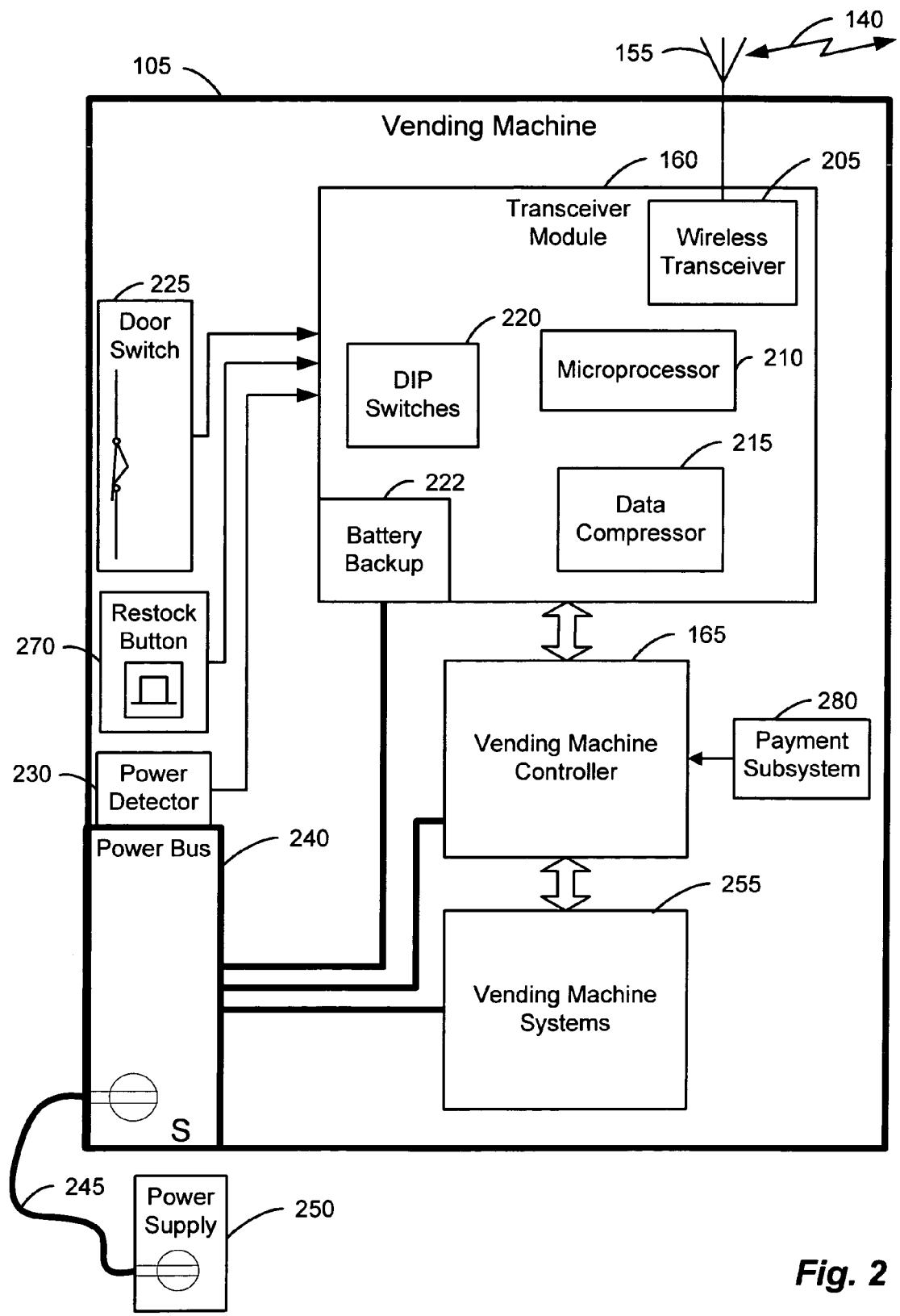
FIG. 2 is a functional block diagram illustrating a vending machine with a wireless transceiver for communicating with a remote data processing system according to an exemplary embodiment of the present invention.

Turning now to FIG. 2, this figure is a functional block diagram illustrating a vending machine 105 with a wireless transceiver 205 for communicating with a remote data processing system 46 according to an exemplary embodiment of the present invention.

A vending machine controller 165 interfaces with various vending machine systems 255 including mechanisms and electronics that accept customer payment from a payment subsystem 280, such as an array of coin slots, and dispense purchased products. The vending machine controller 165 includes a microprocessor (not shown) and associated firmware that controls these vending machine systems 255, for example maintaining the vending machine's product inventory (not shown) at a defined temperature. A data logging function tracks and stores sales and inventory levels of each product stocked in the vending machine 105. A monitoring capability identifies and records the status of each of the vending machine subsystems 255, including device failures and warning conditions.

A technician servicing and/or restocking the vending machine 105 can acquire data accumulated and stored by the vending machine controller 165 since a previous service call. That is, the vending machine controller 165 records data between service calls so that a service technician or route driver can acquire this recorded data at each service call. Recorded data can transfer from the vending machine controller 165 to a mobile data recorder (not shown) carried by the technician over a hardwire connection (not shown).

The transceiver module 160 is electrically coupled to the vending machine controller 165 to access the aforementioned data that the vending machine controller 165 monitors and records. The interface between the vending machine controller 165 and the transceiver module 160 can comprise a direct exchange port or another data port that supports multiple types of vending machine controllers 165. The transceiver module 160 can receive data from vending machine controllers 165 of various vending machine manufacturers that use a common protocol.

In addition to product inventory and sales data or vend data, the transceiver module 160 can receive a variety of codes indicative of operational conditions of the vending machine 105. For example, a code can provide a notification of: a product jam in a particular product column or chute; a cabinet temperature that is too high; a cabinet temperature that is too low; a coin jam; a jam in a bill validator; a blockage in a change inlet chute; or a card reader communication error. The data processing system 46 can receive the notification of an abnormal machine state and prompt a service call to implement corrective action. Analyses performed by the analytics module 185 can take into account abnormal vending machine conditions that may adversely impact sales performance. For example, a performance comparison between two vended products or between two vending machines 105 can weigh the operational readiness of the vending machines 105 involved in the comparison. Properly attributing equipment malfunctions and product problems to the appropriate underlying conditions facilitates refining the operations of a system of vending machines 105 towards enhanced profit performance.

To facilitate auditing vending machine operations, the transceiver module 160 can receive detailed vending data from the vending machine controller 165. Based on such detailed data, the data processing system 46 or the analytics module 185 can identify an occurrence of fraud, theft, or suspicious activities, in addition to optimizing general operational performance. Such detailed information can include accountings of transactions occurring since the last reset of the vending machine 105, such as: cash sales; coins and paper bills input into the vending machine 105; cash dispensed by the vending machine 105; credit or debit card sales; or token-based sales. Optimization software routines of the analytics module 185 can utilize this detailed information to refine a product offering, a vending machine location, or other parameter of a vending operation.

The transceiver module 160 transmits the data acquired from the vending machine controller 165 along with other, independently acquired data to the data processing system 46 via the CMR telephone system 8 and the associated communication gateway 135.

The transceiver module 160 independently acquires data from a variety of sensors that monitor operations of the vending machine 105. Exemplary sensors include a door switch 225, a restocking button 270, and a power detector 230. By monitoring the door switch 225, the transceiver module 160 can detect a service technician or other person opening the vending machine's door (not shown). Opening the door of the vending machine 105 can be indicative of restocking the vending machine's inventory or of inappropriate access such as a product theft intrusion. Detecting theft activities not only facilitates eliminating theft by increasing security, but also enables adjusting vending and inventory data that has been acquired from the vending machine controller 165 to correctly determine the number of products vended to actual customers.

A power detector 230 is coupled to the vending machine's power bus 240 to monitor status of the electrical power supply 240. A power cord 245 connects the power bus 240 to a power supply 250 such as a 110 volt wall socket 250. Monitoring the vending machine's power status facilitates adjusting sales and inventory data that the transceiver module 160 collects from the vending machine controller 165 to compensate for time periods during which the vending machine 105 is inoperable. That is, identifying periods of time that a vending machine 105 is inoperable due to lack of power enhances the accuracy of sales performance comparisons between two or more vending machines 105.

When a service technician restocks a vending machine's product inventory, the technician resets the restocking button 270 to enable tracking sales events and associated inventory depletions occurring between each service call. A battery backup 222 enables the transceiver module 160 to operate without interruption during periods of electrical power loss from the primary power supply 250.

The transceiver module 160 has an array of dual inline pin ("DIP") switches 220 which a technician can configure to set a daily time that the transceiver module 160 will autonomously acquire data from the vending machine sensors 225, 270, 230 and the vending machine controller 165 for wireless transmission over the CMR telephone system 8 to the data processing system 46. To acquire data from the vending machine controller 165, the transceiver module 160 serially interrogates the vending machine controller 165 which responds in kind by providing data in an ASCII format. Using the processing capabilities of an internal microprocessor 210, the transceiver module 160 parses the data stream from the vending machine controller 165 and extracts relevant data, including the number of sales recorded since the vending machine's previous service call. A wireless transceiver 205 in the transceiver module 160 and its associated antenna 155 implements the transmission and reception of data via a wireless data link 140.

Figure 3A:
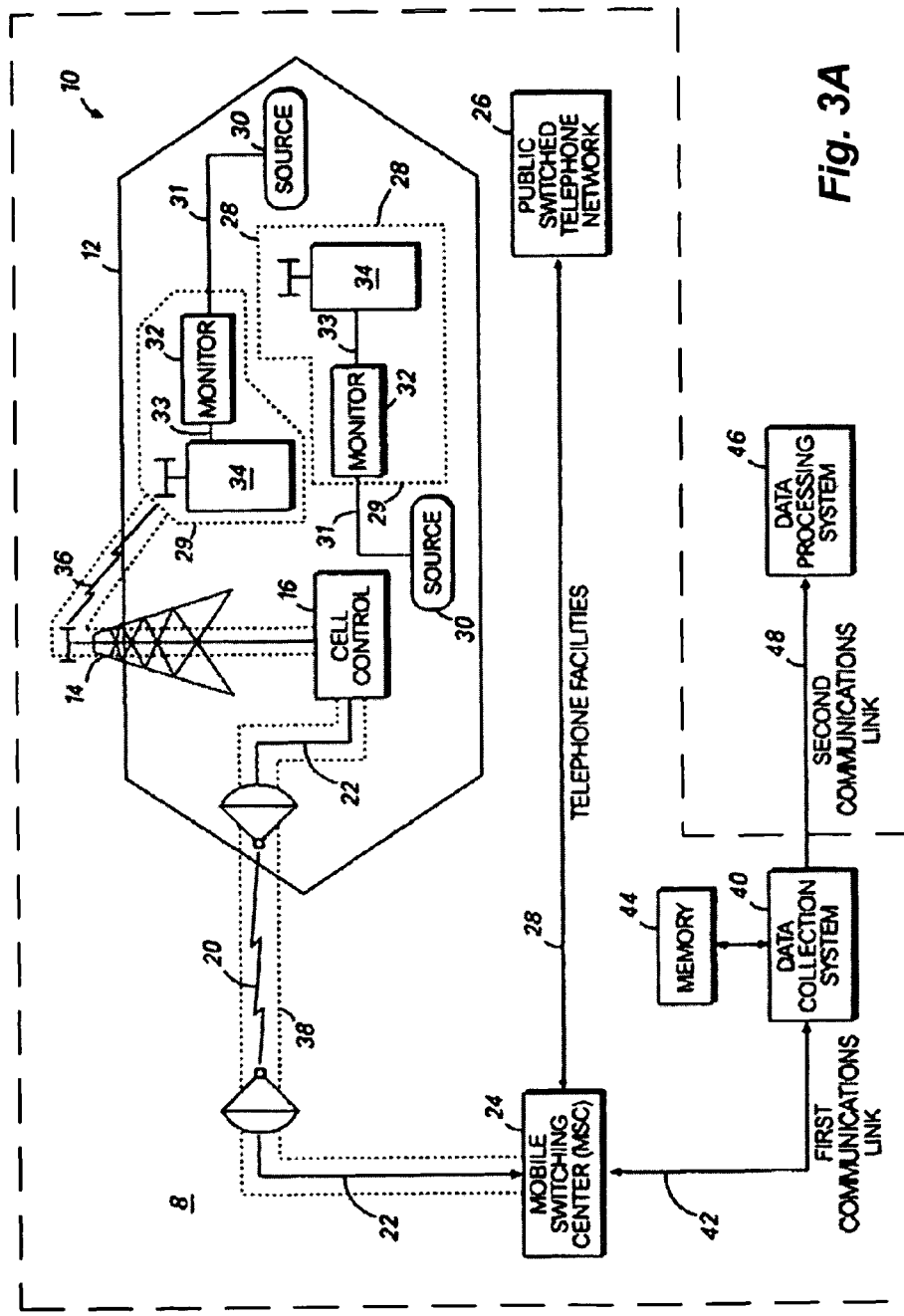
FIG. 3A is a functional block diagram of a cellular communication system according to an exemplary embodiment of the present invention.
Figure 3B:
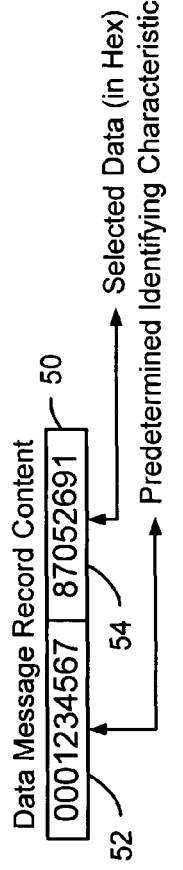
FIG. 3B is a table that shows the format for a data message communicated in the cellular communication system of FIG. 3A according to an exemplary embodiment of the present invention.
Figure 4:
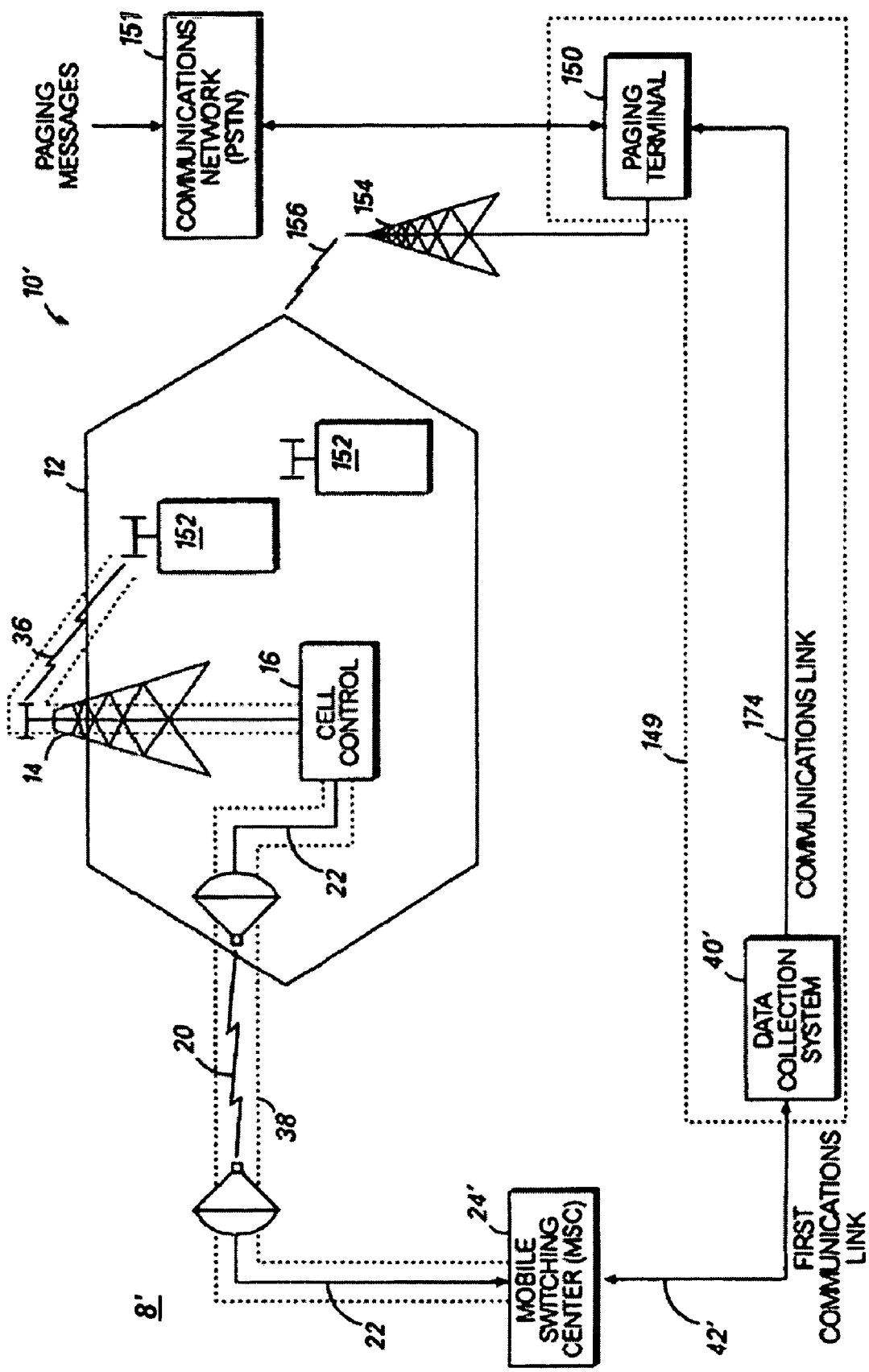
FIG. 4 is a functional block diagram of a cellular communication system according to an exemplary embodiment of the present invention.

Turning now to FIGS. 3A, 3B, and 4, exemplary embodiments of CMR systems will be discussed in the context of general applications that can include voice and data communication, mobile communication, data collection from vending machines 105, utility monitors, and other equipment. In other words, FIGS. 3A, 3B, and 4 illustrate CMR systems 8, 8' that can provide a wide range of voice and data services in addition to communication with a network of vending machines 105. Likewise, the textual discussion of these three figures is somewhat generalized rather than directed specifically at the vending machine application.

Turning now to FIG. 3A, this figure illustrates a functional block diagram of a data message system 10 in the operating environment of a CMR system 8 in accordance with an exemplary embodiment of the present invention.

The data message system 10 communicates data collected from remote data sources 30, such as vending machines 105 as depicted in FIGS. 1 and 2, and includes a set of data reporting devices 29, at least one mobile switching center ("MSC") 24 of the CMR system 8, and a data collection system 40 connected to the MSC 24. In one exemplary embodiment of the present invention, each reporting device 29 is a transceiver module 160 coupled to a vending machine 105 as illustrated in FIGS. 1 and 2 and discussed above. Furthermore, the data collection system 40 can be the communication gateway 135 of FIGS. 1 and 2. Each data reporting device 29 monitors operation of the remote data source 30 to obtain selected data, such as the numbers and types of products that a vending machine 105 has sold over a period of time.

The data reporting device 29 transmits data messages containing the selected data to the MSC 24 via a cellular network control channel of the CMR system 8. The MSC 24 receives data messages from data reporting devices 29 operating within coverage areas of the CMR system 8. The MSC 24 sends the data messages to the data collection system 40 via a first communications link for processing of the information offered by the data messages.

By operating within the environment of a CMR system 8, which is well adapted for portable or mobile communications, one exemplary embodiment of the present invention can take advantage of an existing wide area communications network and avoid the expense of communicating with each remote data site via a dedicated telephone facility or two-way radios. A remote data site can be a shopping center, gymnasium, cafeteria, park, grocery store lobby, of other site that has one or more vending machines 105, for example.

The data message system 10 adapts the existing environment of a CMR system 8 to communicate data from one or more remote sites to a central location. However, to conserve the use of voice channels of the CMR system 8 for telephone conversations, the data collection system 40 uses the cellular network control channel of the CMR system 8 for data communications. The data message is formatted to correspond to a call origination signal, which is normally transmitted by a cellular radiotelephone unit when the device originates a cellular telephone call for communication via a CMR system 8. This permits conservation of the valuable frequency spectrum dedicated to the voice channels of the typical CMR system 8.

In view of the foregoing, it will be understood that one exemplary embodiment of the present invention can adapt existing architecture and communications protocols of a typical CMR system 8 to supply an economical approach to the communication of vending data collected from numerous remote sites that have one or more vending machines 105. It will be further understood that the communication of data messages between an MSC 24 and the cellular communications device can be based upon established techniques and known protocols for CMR system communications. Accordingly, it will be useful to review the primary components and operation of a typical CMR system 8.

A CMR system 8 is generally characterized by dividing a radio coverage area into smaller coverage areas or "cells" 12 using low power transmitters and coverage-restricted receivers. The limited coverage area allows the radio channels used in one cell 12 to be reused in another cell (not shown). As a mobile radiotelephone within one cell 12 moves across the boundary of the cell 12 and into an adjacent cell (not shown), control circuitry associated with each cell 12 detects that the signal strength of the mobile radiotelephone in the just-entered cell 12 is stronger, and communications with the mobile radiotelephone are "handed-off" to the just-entered cell 12.

A CMR system 8 typically uses a pair of radio frequencies for each radio channel and each cell 12. Each cell 12 typically includes at least one signaling channel, also referred to as a cellular network control channel or an access channel, and several voice channels. The control channel is selected or dedicated to receive requests for service from mobiles and portables, to page selected mobiles or portables, and to instruct the mobiles or portables to tune to a predetermined voice channel where a conversation may take place. Accordingly, the control channel is normally responsible for receiving and transmitting data to control the communication actions of the mobile and portable radiotelephones.

The control channel normally comprises a forward channel control ("FOCC") for communications from the MSC 24 to a radiotelephone unit and a reverse channel control ("RECC") for communications from a radiotelephone unit to the MSC 24. The FOCC supplies a multiplexed data stream of message data words, a busy idle signal, and busy idle bits. The busy idle bits are useful for supplying an indication to monitoring radiotelephones about the current status of the RECC. If the RECC is in use by a radiotelephone unit, then the RECC is considered to be busy and the busy idle bit is set to a binary one value. Alternatively, if the RECC is not in use, then the RECC is considered to be idle and the busy idle bit is set to binary zero value. Mobile radiotelephones monitor the busy idle bits transmitted by the FOCC and, if the busy idle bit is set to a binary one value, then the mobile radiotelephone delays transmission on the RECC until the busy idle bit is set to a binary zero value. Thus, a radiotelephone normally transmits on the control channel during the window of opportunity that is presented by a transition from the busy state to the idle state. In particular, the busy idle bit supplies an instantaneous view of the signaling activity on the control channel, and the radiotelephone is responsive to this instant snapshot of control channel activity.

The data message and radio channel specifications for U.S. cellular radiotelephone systems are set forth in Electronic Industries Association/Telecommunications Industry Association ("EIA/TIA") Standard 553, implemented in accordance with 47 C.F.R. Section 22, in the Report and Orders pertaining to Federal Communications Commission ("FCC") Docket No. 79-318. Copies of the EIA/TIA-553 may be obtained from the Engineering Department of the Electronic Industries Association at 2001 Pennsylvania Avenue N.W., Washington, D.C., USA 20006.

When a cellular mobile radiotelephone originates a call, it transmits at least one data message to the serving cell 12 of the CMR system 8. This request for a cellular voice channel, commonly referred to as a Call Origination function, is defined by EIA/TIA-553 and can be implemented as a message or signal having certain defined fields. For example, this call origination message can contain data fields for the low-order seven digits of the unit's telephone number, known as the Mobile Identification Number ("MIN"), the unit's Station Class Mark ("SCM"), which identifies functional characteristics of the unit, and the Called Address, or dialed telephone number. Cellular system operators typically also require additional data words to be transmitted within a call origination message, including the MIN2, which is the high order three digits or number planning area ("NPA") of the cellular unit's telephone number, and the Electronic Serial Number ("ESN").

The MIN is assigned to a particular radio telephone unit by the cellular service provider selected by the subscriber. The MIN typically contains information unique to the CMR system operator, for example, the first three digits of the MIN ("XXX") typically correspond to an area code, the next three digits ("XXX") typically correspond to a geographic location within the area code; and the final four digits ("XXXX") identify a particular piece of equipment. Similarly, the ESN is unique to each mobile cellular radiotelephone unit, and comprises a format that allows differentiation as to manufacturer and, in some cases, the model number, date of manufacture, and the like.

The call origination message is provided first to the serving cell 12 of the CMR system 8, and then through a data link to a MSC 24, which is sometimes referred to as a mobile telephone switching center or a "switch." The MSC 24 makes voice connections between mobile radiotelephones and other telecommunications networks. At the MSC 24, a determination is typically made whether the radiotelephone identified by the message is an authorized user or subscriber by looking up the unit's telephone number, serial number, and other information supplied by the message to see if there is an entry in the MSC's user database (not shown) corresponding to that particular telephone. An optional function of an MSC 24 is to validate that the ESN and MIN received as part of a call origination message are valid. If the MIN is valid and the radiotelephone is identified as a subscriber within the given cellular system, i.e., a "home" unit, the MSC 24 compares the received ESN to a user database entry to detect fraud. If these checks succeed, the cellular call is then allowed to proceed.

When a mobile radiotelephone first powers up or first enters a CMR system 8 when already powered, the unit can identify itself as actively present within the system. The radiotelephone identifies itself or "registers" through a process known as Autonomous Registration by supplying a data packet of information similar to that of a call origination message. The autonomous registration signal, also referred to as a registration or an identification signal, typically comprises data fields for at least a mobile telephone number, i.e., the MIN, and an ESN. Unlike the autonomous registration signal, the call origination signal can include a data field containing the digits of the telephone number to be called, and a flag within a data field to distinguish this message from a registration signal.

An original design goal of Autonomous Registration was to improve the efficiency of potential future call deliveries by keeping the MSC 24 informed of the approximate whereabouts of each individual radiotelephone unit, and to reduce paging channel load by lessening the need to page all cells 12 to find a particular cellular unit. Thus informed, the MSC 24 can later "page" or attempt to ring the cellular unit only in the cell 12 or area of the cellular unit's last known location. Additional cells 12 would be paged only if the initial page did not locate the particular radiotelephone. Thus, the Autonomous Registration function is implemented as messages periodically and autonomously sent from the mobile radiotelephone to the serving cell 12 at an interval specified in data parameters previously received from the cell 12 by the cellular unit.

A subscriber using or attempting to use his or her mobile radiotelephone in a service area outside the home service area is said to be "roaming," and he or she (and the associated mobile radiotelephone unit) is commonly referred to as a "roamer." For example, if a subscriber enters the service area of another CMR system service provider and powers on the radiotelephone, the radiotelephone will subsequently receive a message via the control channel of the particular cell 12 in which the telephone then resides. This message will include a request that the subscriber register for operation in the particular cellular system. In response, the radiotelephone unit transmits both the mobile telephone number and the serial number as identifying information back to the cell site 12. The cell 12 forwards this information to a MSC 24, which quickly ascertains whether the radiotelephone unit is a customer of the local cellular service provider or the customer of another cellular system.

If the radiotelephone unit is a customer of another cellular service provider, the MSC 24 will send a message packet to the home system for the particular telephone unit. This message indicates that the particular radio telephone unit has registered in another cellular system and requests information about the validity of the number and account information for the radio telephone unit. The home system responds by transmitting a responsive packet containing the requested information. If valid, the MSC 24 at the foreign cellular system will then add the roamer to its list of registered users and the home cellular system will add the subscriber associated with the radio telephone unit to a list of roamers that are out of the service area and registered in another area.

When this same radiotelephone unit registers with yet another system, the user database at the MSC 24 for the home system will observe that the unit has moved again and will update its list of where the roaming unit has most recently registered in a user database system. In addition, it will send a message to the first foreign system informing it that the roaming unit has now moved on and registered in another system, and that the first foreign system should delete the particular unit from its list of registered roamers. In this manner, the user databases at the various MSCs 24 are not cluttered with data identifying previously registered roamers as valid accounts for which service should be provided, when these roamers may have long since left the area of service.

The data message system 10 supports the collection and communication of data to a central data collection site 40 by reporting systems associated with numerous data sources 30. A typical CMR system 8 includes a geographic radio service area, such as indicated by the cell 12, of which a plurality of cells are typically provided in a typical cellular service operator's system. The cell 12 is served by a broadcast antenna 14 to permit communications between cellular mobile radiotelephones operating within the cell 12 and a cell control 16. A mobile telephone switching office, such as the MSC 24, can communicate with the cell 12 either by dedicated telephone facilities (not shown) or, more frequently, by a cell-to-mobile switching center data link 22 between the cell control 16 and the MSC 24. At least a portion of the data link 22 is typically supported by a wireless communications link, such as the microwave link 20, located between the cell 12 and the MSC 24.

A typical CMR system 8 comprises at least one mobile telephone switch coupled to an appropriate array of more or less identically equipped cell sites 12. The MSC 24 normally couples telephone conversations involving mobile radiotelephones operating in the cell 12 to the public switched telephone network ("PSTN") 26 through telephone facilities 28.

The data collection system 40 includes a set of data reporting devices 29, each comprising at least one monitor 32 for collecting data from remote data sources 30 and a cellular communications device 34 for communicating the collected data via a control channel of the CMR system 8 to the MSC 24. The monitor 32 depicted in FIG. 3A, which is connected to a corresponding remote data source 30 via a signal path 31, obtains and records selected data directed to the operation or performance characteristics of the data source 30.

Referring briefly back to FIGS. 1 and 2, for collecting data in a vending machine application, each data reporting device 29 can be a transceiver module 160 coupled to a vending machine data source, as described above. The monitor 30 can include one or more sensors, such as a coin slot sensor 280, door switch 225, restock button 270, or power detector 230 and can also include a vending machine controller 165 that provides vend data, temperature, and/or other information relevant to the operation of a vending machine 105.

Referring now to FIG. 3A, the cellular communications device 34, which is connected to the corresponding monitor 32 via a signal path 33, prepares a data packet containing the selected data and transmits the packet as a data message. The selected data represents actual data acquired by the monitor 32 in response to monitoring the operation or performance of the data source 30. Alternatively, the selected data can represent predetermined data or a preprogrammed message that is associated with the detection of a certain event by the monitor 32 for the data source 30.

The MSC 24 receives the data message via a cellular network control channel 38 formed by the combination of the data link 22 and a cellular communications link 36 between the broadcast antenna 14 and the cellular communications device 34. This combination of communications links is collectively referred to as the control channel. A cellular network control channel for a typical CMR system 8 comprises two radio channels that are commonly described as a FOCC and a RECC, as described above. The FOCC serves communications initiated by the MSC 24 to a radiotelephone unit, while the RECC serves communications from the radiotelephone to the MSC 24. The communications operations between the MSC 24 and the cellular communications device 34 also follow this convention. In particular, the control channel 38 comprises two separate data communications paths, an FOCC for communications initiated by the MSC 24 and an RECC for communications initiated by the cellular communications devices 34 (or mobile radiotelephones operating within the cell 12). Accordingly, the cellular communications device 34 transmits data messages via the RECC, whereas the MSC 24 transmits command signals via the FOCC.

In this manner, the MSC 24 receives data messages from each of the cellular communication devices 34 operating within the coverage areas of an array of cells for the CMR system 8. Although the data messages contain selected data rather than the parameters normally contained in an actual radiotelephone control information, the MSC 24 operates upon the data messages as if they were transmitted by a cellular radiotelephone unit operating within the coverage area of the CMR system 8 because the format of the data messages makes them appear as typical call origination signals generated by a radiotelephone unit.

The MSC 24, in response to a data message, can conduct one or more of the following operations: store the data message for processing at a later date, process the selected data supplied by the data message, or forward the data message to a data collection system 40 via a first communications link 42. The data collection system 40, which is connected to a memory storage device 44, collects the selected data by storing the received data messages within the memory storage device 44. Similar to the MSC 24, the data collection system 40 also can process the selected data to obtain further information concerning the operation or performance of the data sources 30. Alternatively, the data collection system 40 can send the information of the data message to a data processing system 46 via a second communications link 48. The data processing system 46 is typically remotely located from the data collection system 40 and facilitates convenient processing of the selected data at a central site. The second communications link 48 is typically implemented by a telephone facility, a dedicated data link, or by a wireless communications link.

In addition to providing an efficient communication network for interfacing with vending machines 105, the data collection system 40 can acquire data from a wide variety of data sources, such as utility meters, community antenna television ("CATV") pay-per-view ("PPV") terminals, equipment operating at isolated sites, and security alarm systems.

For example, in conjunction with collecting data from vending machines 105, the data collection system 40 can monitor one or more loads of an electrical utility system and communicate energy consumption data to a central site for processing. The utility industry typically determines the effectiveness of an electrical load management system for a selected control scenario by collecting or monitoring energy consumption data for certain customers during load management activities. In particular, the utility compares the maximum energy consumed by the selected customers for certain collection periods to the maximum energy that would be consumed by those customers in the absence of any load management activities. A utility typically uses a load profile recorder located proximate to each customer's electrical load for recording the customer's power consumption during predetermined time intervals. Upon the conclusion of the collection period, the recorded energy consumption data is then forwarded from each load profile recorder to a central data processing site such as the illustrated data processing system 46, for data translation and evaluation.

The CMR system 8 can support the operations of such an electrical utility application in tandem with the vending machine application. For the vending machine application, select monitors 32 operate as recorders to obtain operational data from the data sources 30, in this case vending machines 105. The cellular communications device 34 thereafter transmits a data message containing this operational data to the MSC 24. The MSC 24 can then forward the data message to the data collection system 40 for processing of the data or, in turn, the data collection system 40 sends the data message to the data processing system 46 for processing operations. In this manner, an operator of a system of vending machines 105, such as a soft drink bottler, can collect operational data from numerous vending machines 105 to support evaluating and optimizing the effectiveness and profitability of its vending business operations.

In view of the foregoing general information about cellular system operations, and referring still to FIG. 3A, in response to the transmission of a data message by a cellular communications device 34, the MSC 24 typically makes a determination whether the cellular communications device 34 that transmitted the data message is an authorized user or subscriber of the services offered by the cellular system 8 or another system. As shown in FIG. 3B, the data message, formatted as a call origination signal associated with the call origination function, can include certain information that identifies the cellular communications device 34 as a radiotelephone unit which normally operates within a certain remote or "foreign" cellular system. Based upon this information, the MSC 24 decides that the cellular communications device 34 is a roamer because it appears to subscribe to the cellular service offered by another cellular system, which, in this case, is the data collection system 40.

The MSC 24 can maintain a list or user database (not shown) having entries corresponding to the identification information in the data message. At least a portion of the identification information identifies the source of the call origination signal as belonging to a particular cellular system. By checking this user database, the MSC 24 determines whether the cellular communications device 34 is a subscriber or a roamer. A subscriber is typically listed as an entry in the user database, whereas a roamer is generally not initially listed in the user database. Thus, it will be understood that the MSC 24 interprets the data message as a transmission from a roaming mobile radiotelephone operating within the CMR system 8 because the user database fails to contain an entry identifying the cellular source as a "home" unit.

In one exemplary embodiment of the present invention, the remote cellular system identified by the data message can be dedicated to data collection applications, rather than voice communications, and is represented by the data collection system 40. This data collection system 40 can be the communication gateway 135 depicted in FIG. 1 and described above.

The remote cellular system represents the home location register ("HLR") for the cellular service responsible for transmission of the data message. In recognition that the cellular communications device 34 is actually associated with the remote cellular system, the MSC 24 forwards the data message to the data collection system 40 via the first communications link 42.

The data collection system 40 has now received the data message containing selected data collected from the remote data source 30 and, unlike the MSC 24, recognizes that the data message actually contains the desired data collected from a remote data source 30. Accordingly, the data collection system 40 transmits a message to the MSC 24 that instructs the MSC 24 to delete the cellular communication device 34 from its list of registered roamers. It will be understood that the MSC 24 would normally receive this type of message when a roaming radiotelephone has moved to another cellular system and subsequently registered for operation on that other system. Thus, the user database of the MSC 24 is no longer required to maintain the registration information concerning the cellular communications device 34 after transferring the data message to the data collection system 40.

Alternatively, the data collection system 40 can respond to the data message by transmitting a message which confirms that the roamer is a valid user and further instructs the MSC 24 to delete the registration entry upon the expiration of the certain time interval. As a separate option, the MSC 24 can automatically delete a registration entry from the MSC user database upon expiration of a certain time period without any instruction from the data collection system 40. In this manner, the data collection system 40 is not required to send yet another message to the MSC 24 after the data collection system 40 confirms that the cellular communications device 34 represents a valid user.

The MSC 24 and the data collection system 40 can be compatible with the EIA/TIA Interim Standard 41 ("IS-41 standard"). The IS-41 standard defines a communications protocol for communications between two cellular systems. The IS-41 standard includes provisions that facilitate the handoff of cellular calls between dissimilar cellular systems, not unlike the way that calls are handed-off between cells 12 of a single CMR system 8. In addition, the IS-41 standard permits call deliveries and communications exchange for verifying whether a cellular caller is a valid cellular service subscriber. In this manner, the MSC 24 implements the handoff by forwarding the data message to the data collection system 40 via the first communications link 42, which can be implemented as an IS-41-compatible network. In response, the data collection system 40 sends a user validation message via the link 42 to confirm that the source of the data message, specifically a cellular communications device 34, is a valid cellular source.

In particular, the data collection system 40 recognizes that the received data message contains selected data which a cellular communications device 34 has transmitted. Accordingly, the data collection system 40 processes the received data message and compares the predetermined identifying characteristic in its data message to a list of such characteristics in its user database. This user database can contain an entry of the predetermined identifying characteristic for each of the known cellular communications devices 34 and corresponding data that identifies the associated device as a valid cellular source. Upon obtaining a positive match, the data collection system 40 responds to the received data message by sending to the MSC 24 a validation message. The validation message confirms that the roamer associated with the data message is a valid or authorized user of the remote cellular system. However, the data collection system 40 also advises the MSC 24 to not complete the requested call because there is no need to connect the cellular communications device 34 to a voice channel of the CMR system 8 for completing a voice-based telephone communication. Based on the valid user response, the cellular communications device 34 is thereafter added as a registered cellular source to a user database of registered roamers at the MSC 24. It will be appreciated that the data collection system 40 also can forward to the MSC 24 a message confirming the absence of a valid entry for the cellular communications device 34 in response to a negative match.

This validation message can also include a profile of communications services that are authorized for use by the particular cellular source. For example, this user profile typically defines operational limitations for the cellular source, including access to long distance services, the capability for the source to only originate (and not receive) calls via the cellular system, etc. For example, user profile information can contain an instruction that commands the MSC 24 to delete from its user database the registration entry for a particular cellular communications device after the expiration of a defined time period. This function allows the MSC 24 to clear from its user database entries cellular communications devices 34 that have communicated data messages via the MSC 24 when such devices no longer require continued communications support from the MSC 24. For example, such devices do not require continued support for voice communications because they do not require assignment of a voice channel.

The data collection system 40 can store selected data supplied by the received data message within the memory storage device 44, can process the selected data and store the resultant data, or can forward the selected data to the data processing system 46 for processing. Prior to sending the selected data to the data processing system 46, the data collection system 40 first converts the data message to an acceptable communications protocol for conveying the data message to the data processing system 46. This step may be necessary prior to communication with the data processing system 46 because, unlike the MSC 24 and the data collection system 40, neither the data processing system 46 nor the second communications link 48 may be compatible with the IS-41 standard.

Although the MSC 24 may be programmed to treat the cellular communications devices 34 as roamers associated with a foreign cellular system, the user database of the MSC 24 also can be programmed to contain entries for predetermined identifying characteristics of those cellular communications devices 34 operating within cells 12 of the cellular system 8. Upon receiving a data message via the control channel 38 from such a device 34, an MSC 24 containing such user database entries identifies the transmitting cellular communications device 34 as a "home" unit rather than as a roamer because the MSC user database contains an entry that corresponds to the predetermined identifying characteristic supplied by the message. Thus, the MSC 24 registers the transmitting cellular communications device 34 as a home unit of the cellular system 8. This provision avoids a need to contact a foreign cellular system, such as the data collection system 40, to inquire whether the cellular source is a valid user or subscriber of cellular services.

However, to initiate transfer of the information in the data message to the data collection system 40, the MSC 24 can be adapted to recognize that data messages should still be forwarded to the data collection system 40. Specifically, based upon a portion of the predetermined identifying characteristic that is uniquely associated with the data collection system 40, the MSC 24 locates an entry in its user database that commands the switch 24 to send all messages containing such a characteristic to the data collection system 40. Accordingly, the MSC 24 thereafter forwards the data message via the first communications link 42 to the data collection system 40.

The data collection system 40 can be implemented by a computer. In one exemplary embodiment of the present invention, the data collection system 40 is the computer of a service circuit node. Certain manufacturers of switches, such as the MSC 24, also offer devices for implementing communications with the data collection system 40, including the Motorola EMX switch and other vendor proprietary switches. Switch manufacturers include: AT&T Network Systems, Whippany, N.J.; Ericsson Radio Systems, Richardson, Tex.; Hughes Network Systems, Germantown, Md.; and Motorola, Schaumburg, Ill.

The cellular system 8 is can be implemented as an advanced mobile phone system ("AMPS") or a digital advanced mobile phone system ("DAMPS") cellular system. However, it will be appreciated that the cellular system 8 also can be compatible with alternative cellular systems implementing a control channel for mobile to cell communications, including the cellular systems known as: DCS 1800, IS 95-CDMA, JTACS, TACS, ETACS, RC 2000, NMT 450, ESMR, WACS, NMT 900, or other wireless systems.

It will be appreciated that the CMR system 8 includes an array of cells, such as the cell 12, and that a set of reporting systems 29, each formed by the monitor 32 and the cellular communications device 34, are typically located in a cell 12. For each data source 30 within the cell 12, the monitor 32 and the cellular communication device 34 can be located proximate to the data source 30 to minimize the lengths of the signal paths 31 and 33. To facilitate economical installation of the reporting device, the monitor 32 and the cellular communication device 34 can be combined within the same housing and this housing can be installed either adjacent to or as an integral part of the data source 30. For an installation proximate to the data source 30, the signal path 31 and the signal path 33 form hard-wired connections between the connected devices. Nevertheless, it will be appreciated that the signal paths 31 and 33 also can be implemented as either infrared communications links or wireless communications links.

It will be understood that a single cellular communications device 34 can be connected to multiple monitors 32 to permit the transmission of selected data collected from associated data sources 30 located at a central site. For example, a single cellular communications device 34 can be mounted at a central location within or along an office building and multiple monitors 32 can be distributed throughout the building to permit the acquisition of data from the associated data sources 30, such as vending machines 105 dispersed within the building facility.

The data collection system 40 can be located proximate to or as an integral part of the MSC 24, in which case the first communication link 42 can form a hard-wired connection between the devices. However, the data collection system 40 also can be positioned at a remote site. For this remote installation, the first communications link 42 can be implemented as a wireless communications system, such as a microwave system, or as a dedicated data line, such as a telephone facility. For the convenience of the party that is sponsoring the collection of a particular type of data, the data processing system 46 is typically located at another remote site that is typically proximate to the sponsoring party.

FIG. 3B is a table that shows the format for the data message that is communicated by the data message system 10.

Referring now to FIGS. 3A and 3B, a data record 50 for the data message contains both a data field 54 for the selected data acquired from the remote data source 30 and another data field 52 for a predetermined identifying characteristic which uniquely identifies the cellular communications device 34 that initiates the transmission of the data message. The data fields can be separated by one or more selected characters to delimit the data fields. To take advantage of the existing architecture of a CMR system 8, the format for the data message can be identical to the message format (or data record) of a typical call origination signal that is transmitted by a cellular radiotelephone when it originates a cellular call for communication via a CMR system 8.

By using the data message format associated with a call origination message, the cellular communications device 34 can mimic the initiation of a cellular telephone call by sending a data message that appears to contain a valid mobile telephone number and an ESN. Although it is not intended for the cellular communications device 34 to place a voiced-based cellular telephone call, the cellular communications device 34 imitates a cellular radiotelephone device by generating the call origination-formatted signal, thereby enabling a data communication of selected data to the MSC 24.

As shown in the data record 50 in FIG. 3B, the message format for a call origination signal has been adapted by the data message to permit the identification of the particular transmitting cellular communications device 34 and the communication of the selected data. In particular, the data field 52 for the predetermined identifying characteristic corresponds to at least a portion of a mobile telephone number or MIN assigned to the cellular communications device 34. Thus, the predetermined identifying characteristic is substituted within the data field normally reserved for the MIN in the call origination signal. This predetermined identifying characteristic can belong to a set of unassigned mobile telephone numbers. Alternatively, the predetermined identifying characteristic assigned to each cellular communications device 34 can be a telephone number or a set of 10 digits. The predetermined identifying characteristic facilitates identifying the source of the data by uniquely specifying the cellular communications device 34 associated with the remote data source 30. The predetermined identifying characteristic also supplies information used by the MSC 24 to recognize that the data message containing this predetermined identifying characteristic is associated with the data collection system 40.

Furthermore, the data field 54 in the data message for remote data corresponds to the location within the data record of a call origination signal for the ESN. Those skilled in the art will appreciate that the typical ESN data field is 32 bits long and includes 8 bits for a manufacturer code. For cellular systems that do not review or screen ESNs based upon the manufacturer code segment, it is possible to manipulate the data field normally filled by an ESN to supply a data message having a data field 54 containing 32 bits of selected data. However, if the cellular system uses the manufacturer code segment of the ESN, the selected data within the data field 54 comprises a length defined by the remaining 24 bits of the ESN. In most circumstances, it will not be necessary to manipulate the manufacturer's code segment of the ESN because a data message having 24 bits of selected data (and, as required, 8 bits of the manufacturer code segment for a ESN) should be sufficient to supply relevant data. As an option, a Called Address Field (not shown), which normally contains the digits for the called party's telephone number, can be used for the placement of selected data within the data message.

Although adapting certain predefined data fields of a call origination signal is one method for forwarding selected data in a data message to the MSC 24, the message protocol for a registration signal associated with the Autonomous Registration function also can be used to send desired information from the cellular communications device 34 to the MSC 24 via the control channel 38. The call origination signal is substantially similar to the signal for the Autonomous Registration function, with the exception that the call origination signal includes the Called Address Field and a flag to distinguish it from the Autonomous Registration function. This flag permits the CMR system 8 to determine whether a call origination function or a registration function should be conducted in response to a reception of these signals.

As an alternative to one type of ESN, an expandable ESN field has been proposed by members of the cellular radiotelephone industry. The CMR system 8 can utilize an expandable ESN data field to increase the data carrying capacity of the call origination signal or autonomous registration signal. One source of motivation behind this proposal is the potential depletion of available distinctive data sequences for the manufacturer's codes and for other data (e.g., identifying characteristics of each radiotelephone). Because of the increasing popularity of radiotelephones, this depletion has recently become a more imminent concern to the cellular radiotelephone industry.

As discussed, the ESN data field can be 32 bits long and can reserve 8 bits for a manufacturer code. An expandable ESN data field permits a CMR system 8 to recognize a triggering mechanism within the call origination signal or autonomous registration signal, which alerts the CMR system 8 to look elsewhere in the call origination or autonomous registration signal for additional data. Such an expandable ESN data field permits a manufacturer's code to fill the entire ESN data field while permitting the inclusion of additional data within the call origination or autonomous registration signal. The additional data would be accessible to a CMR system 8 that is alerted to the existence of the expandable ESN and to the location of the additional data within the call origination signal or autonomous registration signal.

The expandable ESN data field concept can also be utilized by the data message system 10. To enable the use of expandable ESN data fields, the data message, formatted as either a call origination signal or an autonomous registration signal, may contain a predetermined triggering mechanism that indicates the ESN data field contained in the data message is an expandable ESN data field. In response to the triggering mechanism, the data collection system 40 will be alerted that the ESN data field contains more data than that defined by the EIA/TIA Standard 553 protocol. The data collection system 40 will then look to another portion of the call origination signal or autonomous registration signal for the additional data. An "expandable ESN data field", therefore, includes a ESN data field as well as one or more additional data fields, such as an ESN2 data field.

The triggering mechanism may be implemented in various ways. A first method is to include an ESN flag bit in the call origination signal or autonomous registration signal data packet. For example, if the ESN flag bit is set to a binary one value, then the data collection system 40 will be alerted to "look for" the additional data in another portion of the data packet. If, on the other hand, the ESN flag bit is set to a binary zero value, then the data collection system 40 will not look for additional data, and will merely process the data within the standard data packet.

Turning now to FIG. 4, this figure illustrates a functional block diagram of an alternative embodiment of data message system in the operating environment of a CMR system 8' in accordance with an exemplary embodiment of the present invention. A paging acknowledgment system 10' operates within the environment of a CMR system 8' for communicating acknowledgment messages in response to reception of paging messages. With this functionality, a paging party that uses the communications services offered by the system 10' can receive an acknowledgment that a paged party has actually received the paging message.

The paging acknowledgment system 10' takes advantage of the installed equipment offered by a CMR system 8', to supply either a local area or wide area communications system for communicating acknowledgment messages. Because the acknowledgment messages contain stored information rather than voice-based information, the system 10' can communicate acknowledgment messages exclusively with the cellular network control channel of a CMR system 8'. By avoiding any use of the valuable voice channels of a CMR system 8', the system 10' conserves the use of the voice channels for telephone conversations by users of cellular radiotelephones. Accordingly, the system 10' facilitates expanded use of available resources offered by existing or adapted equipment for a CMR system 8' while minimizing interference to voice-based applications, namely telephone conversations.

As shown in FIG. 4, the paging acknowledgment system 10' includes a communications system 149 comprising at least one radiopaging terminal 150 and a data collection system 40', one or more remote communications devices 152, and at least one MSC 24 associated with the CMR system 8'. In general, the communications system 149 responds to a paging message from a paging party by preparing a data message that corresponds to the paging message. A particular acknowledgment code, which is assigned by the communications system 149 to the data message, is stored to support a subsequent determination of whether the data message has been properly acknowledged by one of the remote communications devices 152. The communications system 149 thereafter transmits the data message via a communications path 156 to a selected remote communications device 152.

A selected remote communications unit 152 receives the data message and thereafter prepares an acknowledgment message containing the acknowledgment code taken from the data message. The selected remote communications device 152 then transmits the acknowledgment message to the MSC 24' via the cellular network control channel 38. The MSC 24' recognizes that the source of the acknowledgment message is associated with the communications system 149 and forwards the acknowledgment message to the communications system 149 via a first communications link 42'. The communications system 149 processes the acknowledgment message and determines whether the acknowledgment message corresponds to a particular one of the data messages. This determination derives from comparing the acknowledgment code in the acknowledgment message to the stored acknowledgment codes associated with data messages. Following a successful match, the communications system 149 can store the acknowledgment for later use.

Referring still to FIG. 4 and reviewing in more detail the operation of the paging acknowledgment system 10'. a party desiring to contact another party at a remote site forwards a paging message via a communications network 151 for eventual transmission by the radiopaging terminal 150. In response to the paging message, the radiopaging terminal 150 transmits a data message, which corresponds to the paging message, via an antenna 154. The combination of the radiopaging terminal 150 and the antenna 154 can operate as a radiopaging system having the capability of broadcasting data messages over a known geographical area. A remote communications device 152, operating within the geographical coverage area, is responsive to a data message containing its particular address. Specifically, the remote communications device 152 transmits an acknowledgment message via a cellular network of the CMR system 8', namely the control channel 38' and the MSC 24'. The reception of the acknowledgment message by the MSC 24' enables the process for verifying the reception of the data message.

The radiopaging terminal 150 may receive a paging message via the communications network 151, such as a specific PSTN. It will be appreciated that the communications network 151 can be implemented as other known communications systems, including a data network, such as a value added network ("VAN") (not shown), or a dedicated data line (not shown). The radiopaging terminal 150 handles the special requirements for an acknowledgment system and responds to the paging message by preparing a corresponding data message. The data message includes the following information: (1) an address that uniquely identifies the intended receiving device, specifically a selected remote communication device 152; (2) an acknowledgment code that uniquely identifies the particular data message and the corresponding paging message; and (3) paging data associated with the paging message.

The paging party typically supplies the information associated with the address for the selected remote communications device 152 and the paging data for communication to the user of the selected device 152. In contrast, the radiopaging terminal 150 is adapted to supply the acknowledgment code for use with the data message and can store or archive the acknowledgment code to permit later comparisons to an acknowledgment code returned in acknowledgment messages from the remote communications devices 152. Each data message is assigned a unique acknowledgment code to support the comparison of data messages to a particular acknowledgment message. The radiopaging terminal 150 thereafter can transmit the data message via a radiopaging network to complete the communication of the paging message to the intended paged party.

For local area communication of a paging message, the radiopaging terminal 150 transmits the corresponding data message for direct reception by a selected remote communications device 152 that is known to normally operate within the geographic coverage area of the radiopaging terminal 150. However, if the remote communications device 152 normally operates outside of the geographical coverage area of the radiopaging terminal 150, then the terminal 150 forwards the data message to another paging terminal via a national paging network (not shown) for transmission of the data message within the appropriate geographical area. This use of a group of paging terminals connected by a radiopaging communications network to form a wide area communications network is common within the paging industry. The following description of the operation of the system 10' is based upon local distribution of the data message to the remote communications device 152.

The radiopaging terminal 150 communicates with the remote communications devices 152 operating within its geographical coverage area via a radiopaging communications path 156, which can be implemented as a wireless communications system, such as a microwave or radio frequency ("RF") radio link. However, it will be understood that the radiopaging communications path 156 also can be implemented by a wired communications system, including a dedicated data line or a telephone facility. For the communications path 156, the radiopaging terminal 150 transmits the data message via the antenna 154.

A remote communications device 152 responds to a data message containing its particular address by supplying the paging data associated with the paging message to the user of the device 152. In a manner similar to a pager, the remote communications device 152 outputs an alert to the user to indicate the reception of a data message and thereafter presents the paging data to the user. The alert can be a visual, audible, or tactile signal and the presentation of the paging data can be conducted in an audible or textual (or graphical) format.

The remote communications device 152 further responds to the data message by sending via the CMR system 8' an acknowledgment message that includes the acknowledgment code of the data message. It will appreciated that the acknowledgment code permits a subsequent correlation between the outgoing data message (and corresponding paging message) and the incoming acknowledgment message. The acknowledgment message contains information in a data-type format to permit communication of this information via the control channel 38'. In particular, to take advantage of the architecture of a CMR system 8, the acknowledgment message is formatted to appear as a call origination signal that is transmitted by a cellular radiotelephone unit for completing a Call Origination function, i.e., when the cellular unit originates a cellular telephone call for communication via the CMR system 8.

The remote communications device 152 sends the acknowledgment message to the cell control 16 in the cell 12 via a cellular communications link 36. In turn, the cell control 16 forwards the acknowledgment message to the MSC 24' via the data link 22. The control channel 38, which is formed by the data link 22 and the cellular communications link 36, permits the communication of control signals between each remote communications device 152 within the cell 12 and the MSC 24'.

The MSC 24' receives the acknowledgment message via the control channel 38 and, based upon certain information supplied in the acknowledgment message, determines that the message appears to have been transmitted by a roaming radiotelephone unit. Without any recognition that the acknowledgment message was actually transmitted by an adapted cellular device, such as a remote communications device 152, the MSC 24' treats the acknowledgment message as if the message had been transmitted by a "roamer"-type cellular device. Accordingly, the MSC 24' forwards via a first communications link 42' the acknowledgment message to another cellular system associated with this roamer, a data collection system 40'. In turn, the data collection system 40' recognizes that the acknowledgment message contains an acknowledgment code and sends the code via the communications link 174 to the radiopaging terminal 150 for comparison with the stored acknowledgment codes assigned to the outgoing data messages. A successful match confirms the reception of a data message corresponding to a particular paging message.

In response to a data message, the remote communications device 152 either transmits the data message in an automated mode without subscriber intervention or in a manual mode controlled by the subscriber. By transmitting an acknowledgment message having a message format associated with the fields of a call origination signal, the remote communications device 152 mimics the "call origination" function for a cellular radiotelephone. To the MSC 24', the acknowledgment message appears to contain both a valid mobile telephone number and an ESN. Although the remote communications device 152 is merely attempting to send an acknowledgment as a data-type signal via the control channel instead of placing a voice-based telephone call, the MSC 24' operates on the acknowledgment message as if it contained information found in the fields of a call origination signal. This enables communication of the acknowledgment code via the cellular network control channel 38 of the CMR system 8'.

In response to an acknowledgment message, the MSC 24' determines whether the device that transmitted the signal is an authorized user or subscriber of the services offered by the CMR system 8'. This determination is based upon the acknowledgment code within the data record 172, which corresponds to the MIN information for a call origination signal. At least a portion of the acknowledgment code indicates that the selected remote communications device 152 is associated with another "remote" cellular system. Based upon this information, the MSC 24' checks its user database and determines that the remote communications device 152 subscribes to a remote cellular system, namely the data collection system 40', which represents a home location register. Accordingly, the MSC 24' can determine that the source of the acknowledgment message should be treated as a roamer. Thus, it will be understood that the MSC 24' interprets the acknowledgment message as a transmission from a roaming mobile radiotelephone operating within the CMR system 8'.

The remote cellular system, which is identified by a portion of the acknowledgment code, is not an actual operating cellular system for supporting telephone conversations, but rather is dedicated to acknowledgment-based applications and is represented by the data collection system 40'. In recognition that the remote communications device 152 is associated with this remote cellular system, the MSC 24' forwards the acknowledgment message to the data collection system 40' via a first communications link 42'. The data collection system 40' responds by sending to the MSC 24' a validation message which confirms that the source of the acknowledgment message is associated with the data collection system 40' and that the MSC 24' should accept communications from that source. This validation message also can indicate that the MSC 24' should deny cellular voice-based communications privileges for this source because no voice-based call is actually associated with the acknowledgment message transmitted by the responsible remote communications device 152. This type of validation message prevents the MSC 24' from attempting to assign a cellular voice channel for use by the source of the acknowledgment message. It will be understood that the remote communications device 152 uses the format of the call origination signal to forward acknowledgment data rather than to initiate a cellular telephone call. In turn, the remote communications device 152 is added to a user database of registered roamers at the MSC 24'.

The data collection system 40' can subsequently transmit a message to the MSC 24' via the link 42' that instructs the MSC 24 to delete the remote communications device 152 from its list of registered roamers. This entry is deleted from the MSC user database because it is no longer necessary to maintain the registration information concerning the remote communications device 152 after the transfer of the acknowledgment message to the data collection system 40'. Alternatively, the user database entry for the registered remote communications device 152 is deleted by the MSC 24' upon the expiration of a time interval.

Unlike the MSC 24', the data collection system 40' recognizes that the acknowledgment message contains certain data which confirms that a selected remote communications device 152 has received a data message and has forwarded a response, specifically the acknowledgment message containing the acknowledgment code and the operation data. Accordingly, the data collection system 40' sends the acknowledgment code and the operation data via a communications link 174 to the radiopaging terminal 150 to permit the paging terminal to update its acknowledgment records.

In turn, the radiopaging terminal 150 can compare the acknowledgment code supplied by the data collection system 40' to its list of acknowledgment codes assigned to data messages (and corresponding paging messages). A successful match indicates that the intended recipient of the paging message, specifically a selected remote communications device 152, has received the data message and has forwarded an acknowledgment message to confirm the data message reception. Based upon this comparison, the radiopaging terminal 150 stores acknowledgment information in a user database or in a memory storage device to archive this acknowledgment of the paging message for access by the paging party. The radiopaging terminal 150 can also store the operation data, if any, to permit access by the paging party to the response from the user of the selected remote communications device 152.

It will be understood that the data collection system 40' and the radiopaging terminal 150 can be installed as separate systems located at different locations or as fully integrated equipment at the same site.

Although this description of the paging acknowledgment system refers to the use of the remote communications unit 152 by a subscriber to a paging service, it will be understood that the remote communications unit 152 also can supply paging information to vending machines 105 adapted to receive such paging information as illustrated in FIGS. 1 and 2 and discussed above. More specifically, the remote communications unit 152 can be the wireless transceiver 205 in the transceiver module 160 of a vending machine 105. The transmission of the data message by the radiopaging terminal 150 is useful for initiating an operation by the adapted vending machine 105, such as the recording of data from a vending machine controller 165. In response to the data message, the vending machine controller 165 also can supply operation data to the remote communications unit 152 for transmission via the cellular system 8' to a central collection site such as a data processing system 46. The acknowledgment message transmitted by the remote communications unit 152 can contain operation data such as vend data, including recorded vend data. Thus, the remote communications unit 152 can be connected to an adapted vending machine 105 via a hardwired connection or a wireless link to permit the exchange of data messages and operation data.

Referring to FIG. 4, similar to the data message system 10', communications between the data collection system 40' and the MSC 24' can be compatible with the IS-41 standard. Accordingly, the MSC 24' can hand-off or forward the data message to the data collection system 40' via the first communications link 42', which can be implemented as an IS-41 network. However, it should also be understood that other devices and protocols are useful for implementing communications with the data collection system 40', including the Motorola DMX protocol and other vendor proprietary protocols.

Those persons skilled in the art will appreciate that the data collection system 40' and the radiopaging terminal 150' can be separate systems located at different locations or can be installed at the same site as fully integrated equipment.

Processes and components of an exemplary embodiment of the present invention will be further described in reference to FIGS. 5-11, which include illustrations of flow charts and programs. The present invention can include multiple computer programs that embody the functions described herein and that are illustrated in the exemplary functional block diagrams and the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the exemplary displays, functional block diagrams, and flow charts and associated description in the application text, for example.

Therefore, disclosure of a particular set of program code instructions is not considered necessary for an adequate understanding of how to make and use the invention. The inventive functionality of the computer program aspects of the present invention will be explained in more detail in the following description in conjunction with the remaining figures illustrating the functions and program flow.

Certain steps in the processes described below must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

Figure 5:
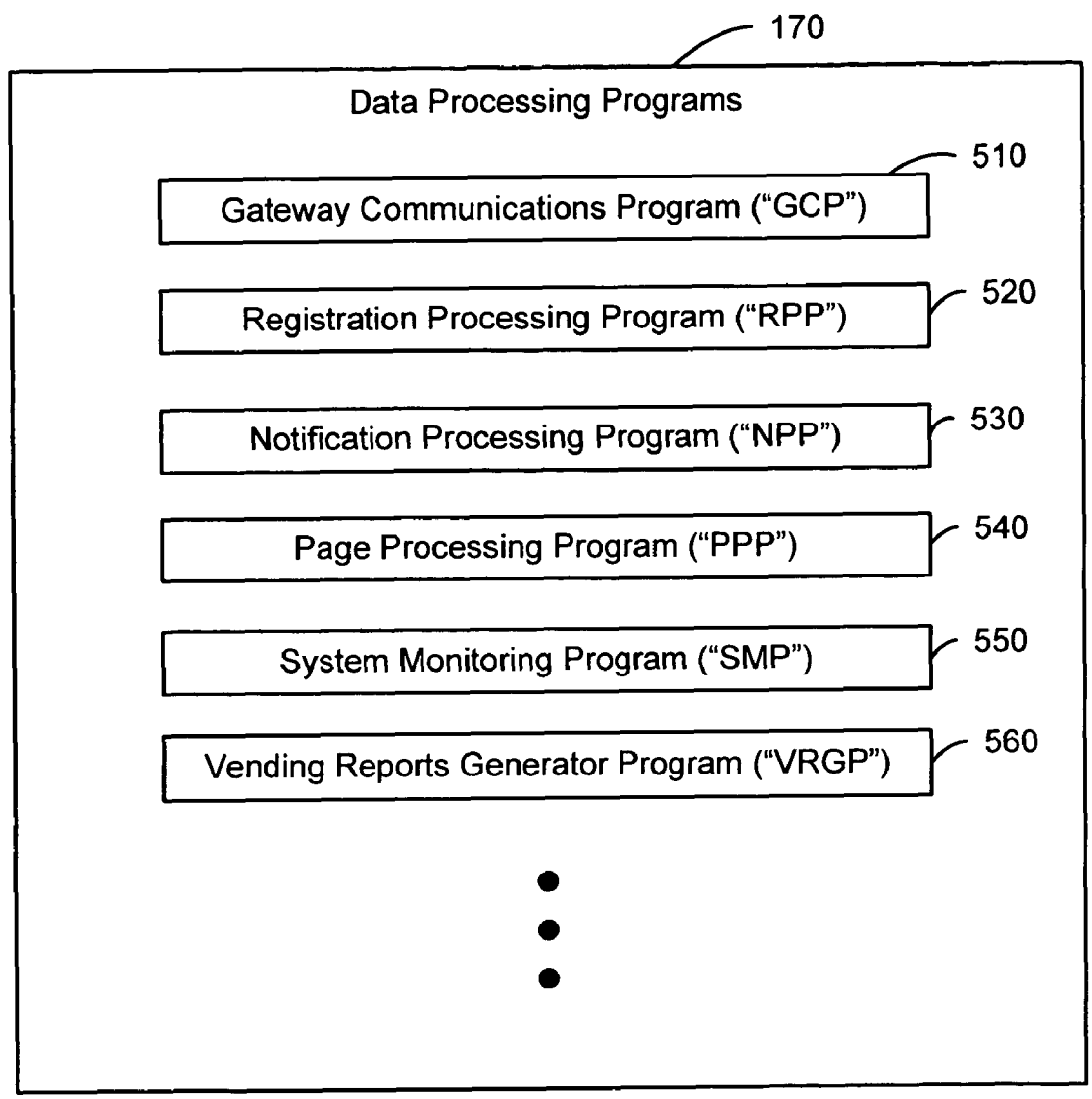
FIG. 5 is a functional block diagram of data processing software programs for processing wirelessly transmitted data associated with one or more vending machines according to an exemplary embodiment of the present invention.

Turning now to FIG. 5, this figure is a functional block diagram of data processing software programs 170 for processing wirelessly transmitted data associated with one or more vending machines 105 according to an exemplary embodiment of the present invention. As described above in reference to FIG. 1, the data processing programs 170 are typically located in the data processing system 46 but can alternatively reside at another site that has network access to wirelessly acquired vending machine data.

The data processing programs 170 support and manage data acquisition, wireless transfer of acquired data, and low-level data processing. The gateway communications program ("GCP") 510 coordinates and executes data transfer between the communication gateway 135 and the data processing system 46. For messages outbound to a vending machine 105, the GCP 510 transfers to the communication gateway 135 page requests that include a communication address of a specific wireless transceiver 205 and one or more embedded commands. The GCP 510 also receives incoming messages and extracts registration information for subsequent processing by the registration processing program ("RPP") 520 and the other data processing programs 170 in the data processing system 46.

The RPP 520 processes incoming messages to extract vending machine operational data, such as sales and inventory data, for tabulation and storage in dedicated files at the data processing system 46. The RPP 520 correlates each incoming message with a wireless transceiver 205 and vending machine 105 by identifying a 32-bit, 10-digit serial number associated with the message that is unique to that specific transceiver 205.

The notification processing program ("NPP") 530 handles management and implementation of notifications via e-mail based on simple mail transfer protocol ("SMTP"), which is the standard e-mail protocol of the Internet. The NPP 530 further supports transmitting e-mail messages containing vending information to cell phones, pagers, desktop computers, another other devices compatible with SMTP-based e-mail.

The page processing program ("PPP") 540 manages commands outgoing to one or more vending machine wireless transceivers 205 by placing outgoing commands in a queue then processing each command in the queue in a serial manner based on queue position. The PPP 540 can coordinate polling operational information from a group of vending machines 105 by generating a command to transmit information, replicating the command for each vending machine 105 in the group, addressing each replicated command with a vending machine address, and queuing the replicated commands for serial processing and transmission over the CMR telephone system 8.

The system monitoring program ("SMP") 550 monitors system-wide status and provides notification of any identified errors to each of the system's subsystems.

The GCP 510, RPP 520, NPP 530, PPP 540, and SMP 550 support not only the vending machine application but also data services with other equipment connected to the CMR radio telephone system 8, such as electrical utility monitors. That is, these programs 510, 520, 530, 540, and 550 process incoming and outgoing messages from multiple applications that transmit data through the CMR telephone system 8 via the communication gateway 135.

In addition to the programs 510, 520, 530, 540, and 550 that serve multiple applications, the data processing programs 170 can include programs, such as the vending reports generator program ("VRGP") 560, that are specific to the vending machine application. The VRGP 560 compiles vending machine operational data and related messages and organizes this information for presentation and viewing on the PC-based GUI 180 or paper print out. The VRGP 560 facilitates managing a set of vending machines 105 that may be located along a route that a route driver follows to provide routine restocking service. As a management aid, the VRGP 560 can provide calculations of estimated and actual fill values for a vending machine 105.

At a time specified by a vending machine operator, usually in the evening, the VRGP 560 calculates a number of stocked products, also referred to as stock keeping units, needed to fill the vending machine 105. This calculation can be based on raw vending data, specifically the number of vends for each machine selection that occurred since the last restocking service. The VRGP 560 tabulates the calculated data for storage in the database 175 and adds a margin of stocked products to the base calculations to account for sales projected to occur prior to the next scheduled opportunity to the restock vending machines 105 located along a service route. Based on restocking thresholds or other criteria discussed herein, a specific vending machine 105 can receive restocking service at the next route trip. Alternatively, the route driver can skip a vending machine 105 if conditions indicate that service is not needed.

A vending machine operator, such as a bottler, can receive route planning data that the VRGP 560 generates via importation into the operator's management information system or proprietary route management systems. The analytics module 185 can present such tabulated data at the vending machine level, at the route level, or at the truck level. Thus, a vending machine operator can receive a table that lists data for each vending machine 105 on a route of vending machines 105. The operator can determine the vending machines 105 of a route that need to be restocked, the amount of products needed to restock each vending machine 105, and the quantity of products that should be loaded onto a truck that transports products for a route.

In conjunction with restocking each vending machine 105, the route driver normally presses a restock button 270 coupled to the transceiver module 160. Pressing this button 270 initiates sending a notification of the restocking event to the data processing system 46 along with current vend data. The VRGP 560 receives the transmitted vend data to track actual fill data for the serviced vending machine 105. The vending machine operator can review such actual data for each vending machine 105 or for a route of vending machines 105 and compare the projected amount of product needed to restock the vending machine 105 with the actual amount of product used to restock the vending machine 105. Such comparison can facilitate adaptively refining vending forecasts to enhance forecasting accuracy.

The data processing programs 170 can communicate and interact with the analytics module 185. In response to a user prompt or automatically at a predefined time, the analytics module 185 generates one or more tables or reports suitable for management review listing product selections, stock keeping unit numbers, inventory, and sales for a group of vending machines 105. A report can show a bottler the quantity of each product vended for each day of a selected month for a select vending machine 105, for example. Such a report can include a graphical button that a user can select via the PC-based GUI 180 to create another report or table populated with vend data stored on the database 174, for example describing another vending machine 105.

The analytics module 185 can assemble raw data into reports or alternatively prepare reports that present sales and other data processed over a time period, for example presenting a monthly or an annual sales report that includes trend analysis. A bottler can download from the PC-based GUI 180 report data provided as a flat file using bottler-specific data formatting. The bottler's computer-based information systems can import this data for planning and operational management activities.

Tables or reports generated by the analytics module 185 include estimated fill reports, route itineraries, and truck stocking reports that can be stored in the database 175 for viewing on the PC-based GUI 180 or for printout. The vending management system 100 makes such reports available to personnel throughout a bottling organization who are involved in logistical aspects of product distribution to assist their product delivery preparations.

The data processing programs 170 of the data processing system 46 can also include other programs that manipulate, manage, organize, or process operational data acquired from vending machines 105 via the CRM telephone system 8. For example, while FIG. 1 illustrates the analytics module 185 located at the web-based interface 125, in one exemplary embodiment of the present invention, the analytics module 185 resides in the data processing system 46. Furthermore, the functions and programs of the vending management system 100 can be distributed among multiple computers that can be spatially dispersed on a distributed computing network such as the Internet 120, intranet, or other computing network known to those skilled in the art.

Figure 6A:
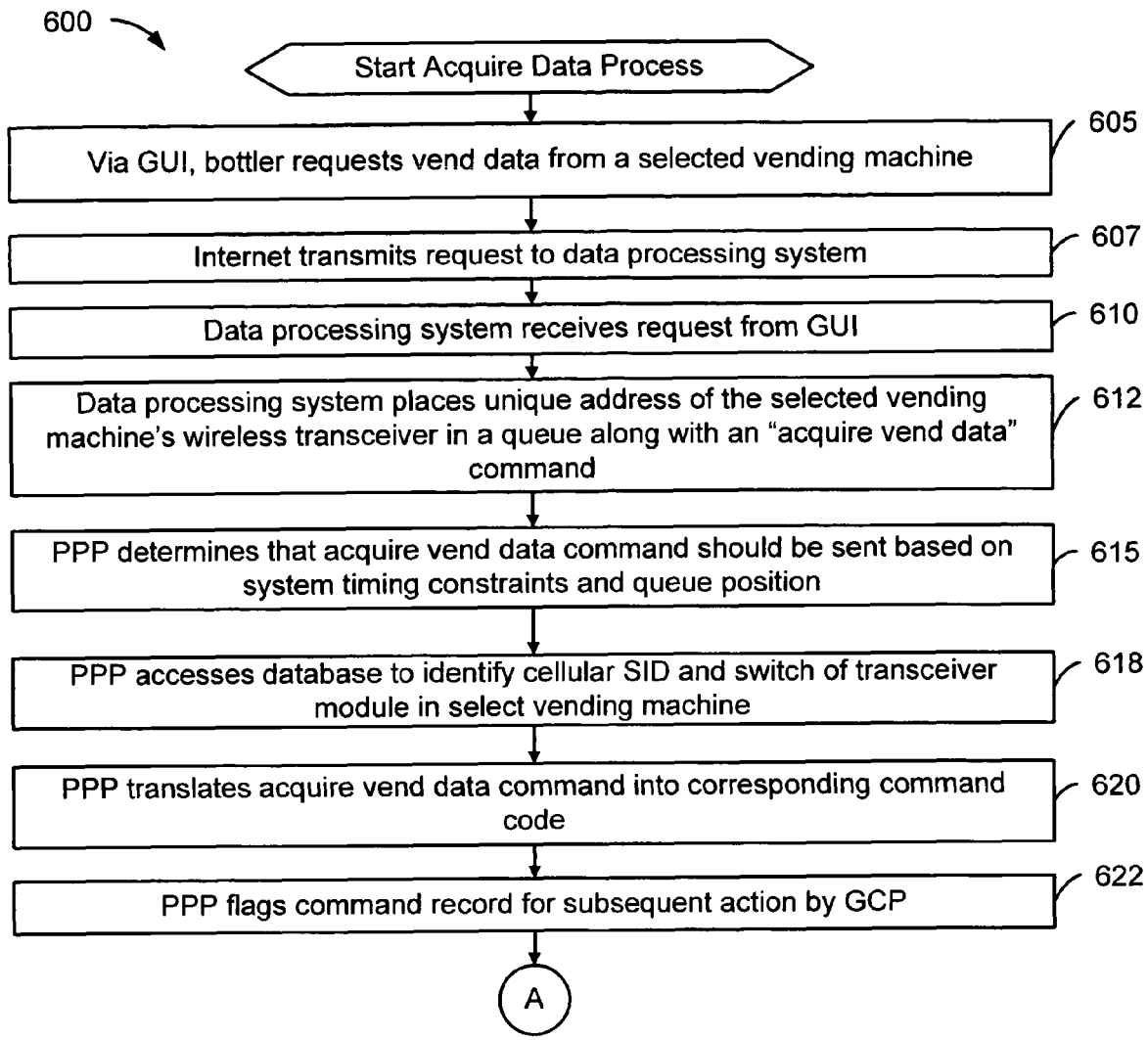
FIGS. 6A, 6B, and 6C illustrate a process for acquiring data from a vending machine via a cellular network according to an exemplary embodiment of the present invention.
Figure 6B:
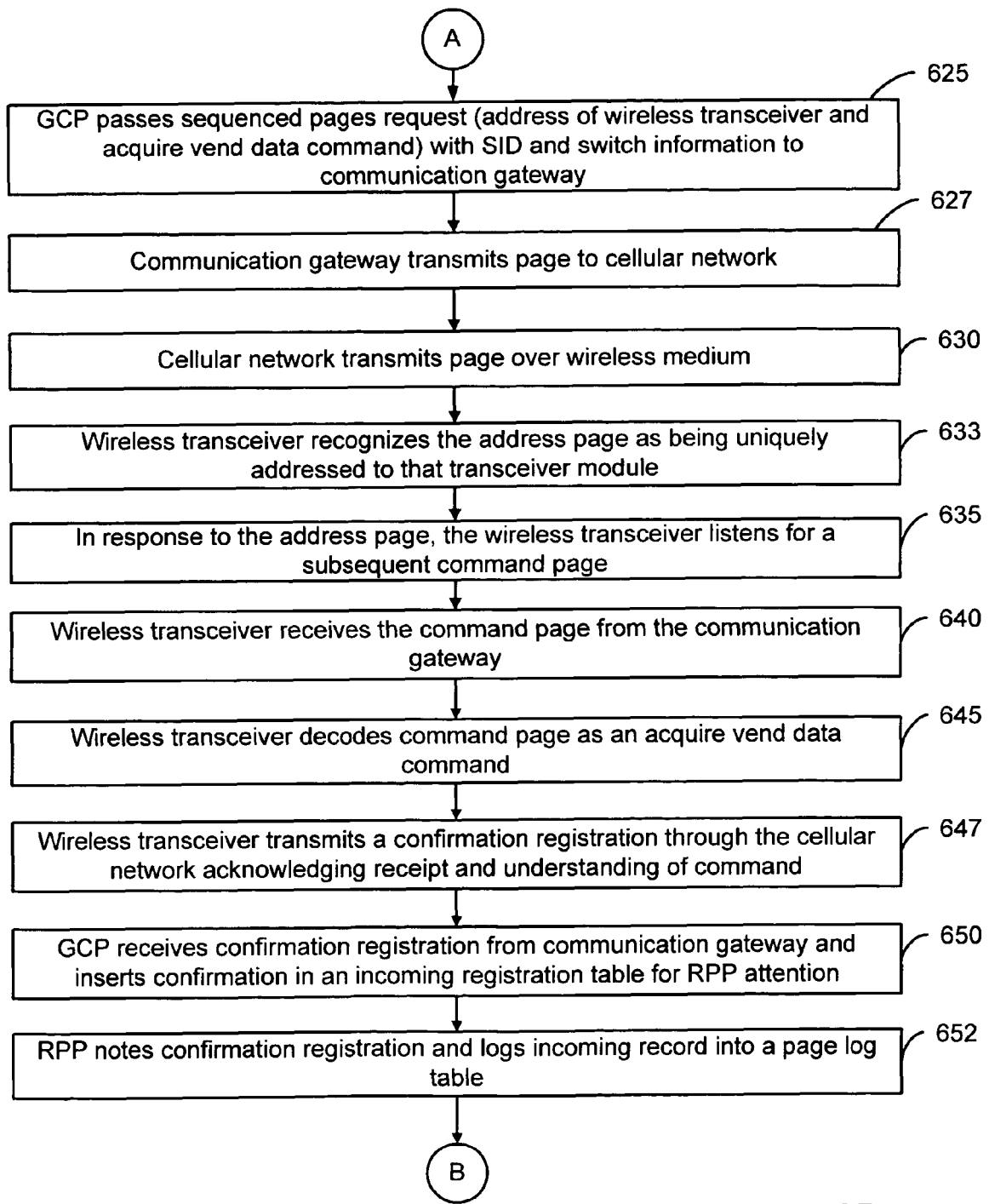
Figure 6C:
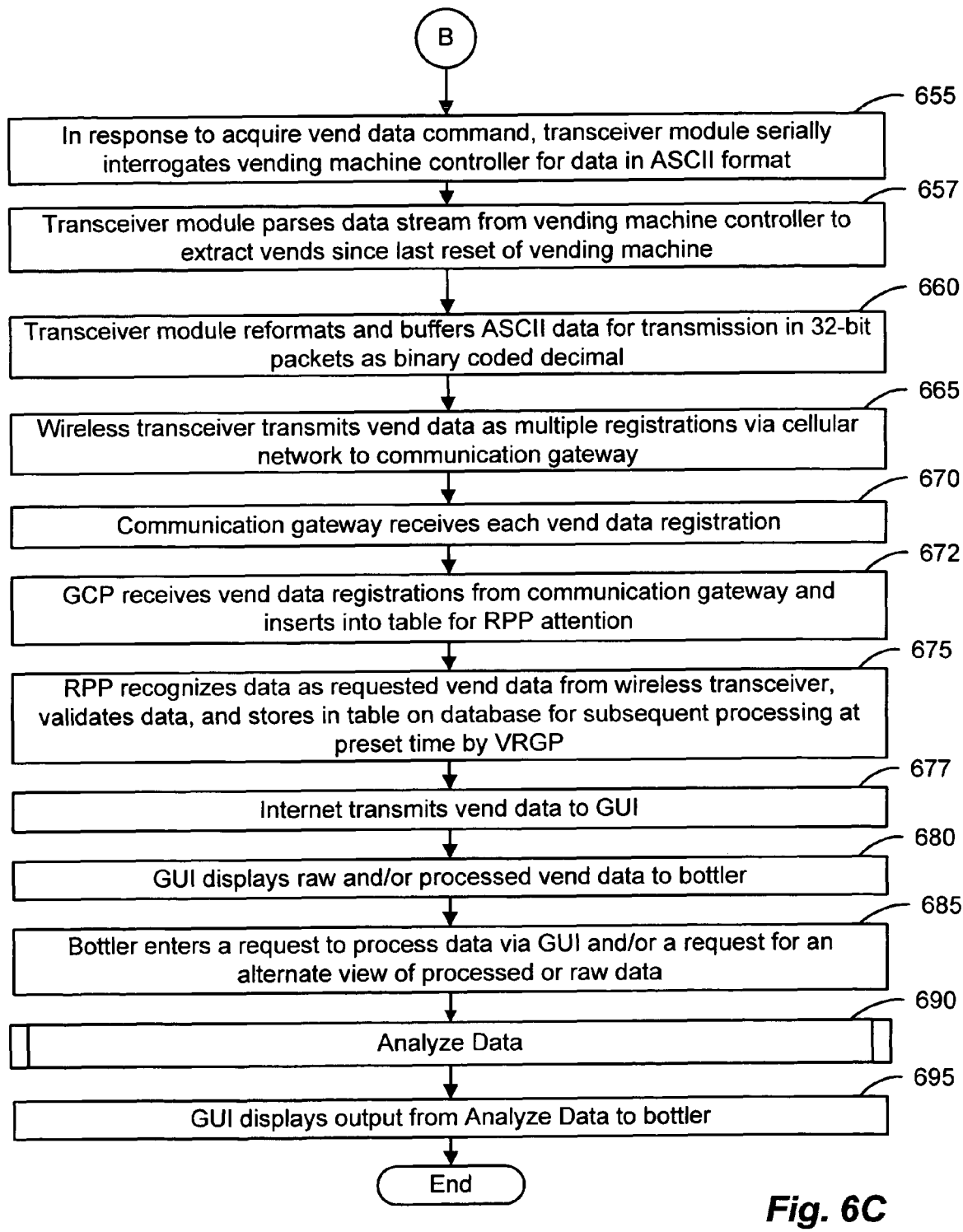

Turning now to FIGS. 6A, 6B, and 6C, these figures illustrate a process 600, entitled Acquire Data, for acquiring data from a vending machine 105 via a cellular network 130 according to an exemplary embodiment of the present invention. For clarity of explanation, Process 600 illustrates exemplary steps for manually initiating data acquisition from a vending machine 105. As described above, the vending management system 100 can also automatically poll each vending machine 105 in a system of geographically dispersed vending machines 105 at a programmed time interval such as at the end of each day or week.

At Step 605, the first step in Process 600, a soft drink bottler or other manager of a vending machine operation enters a request for vending data from a specific vending machine 105 into the PC-based GUI 180. This user can be located at a bottling facility such as an operational headquarters or at any other site that provides Internet connectivity. That is, the web-based interface 125 can include an Internet portal with password-controlled access.

At Step 607, the request transmits over the Internet 120 to the data processing system 46 for receipt at Step 610. At Step 612, the data processing system identifies the unique address of the selected vending machine's wireless transceiver 205 and places this address and its associated "acquire vend data" command in a queue.

The PPP 540 manages the queue and processes each queued command in its assigned order. At Step 615, the bottler's request is in the queue's execution position, and the PPP 540 verifies that processing the request will not cause a timing conflict with other tasks. This queue position and the availability of timing resources results in a determination by the PPP 540 that the acquire vend data command should be communicated to the specified vending machine's wireless transceiver 205.

At Step 618, the PPP 540 access the database 175 and matches the system identification code ("SID") and switch of the wireless transceiver 205 with the vending machine 105 that the bottler selected at Step 605. At Step 620, the PPP 540 translates the acquire vend command into command code that is formatted for transmission in the overhead control channel of the cellular network 130 as a page that is understandable by the firmware instructions in the transceiver module 160. At Step 622, the PPP 540 flags the command record for processing by the GCP 510 in preparation for wireless transmission.

At Step 625, illustrated on FIG. 6B, the GCP 510 transmits a sequence of pages that incorporate the address of the selected vending machine's wireless transceiver 205 and the acquire vend data command to the communication gateway 135. A first page contains the SID and associated switch information that enables delivery of the command via the cellular network 130. One or more subsequent pages contain the command that instructs the recipient wireless transceiver 205 to acquire vending data and transmit the acquired vending data back to the data processing system 46.

At Step 627, the communication gateway 135 receives the pages and transmits the address page to the cellular network 130 using IS-41 or SS7 communication protocol as discussed above. At Step 630, the cellular network 130 receives and transmits the address page 145 over the wireless medium of air to the wireless transceiver 205.

At Step 633, the wireless transceiver 205 recognizes the address page 145 as being uniquely addressed to that transceiver 205. Receipt of this address page 145 alerts the addressed wireless transceiver 205 to listen and respond to the subsequent command page 145.

At Step 640, the communication gateway 135 sends and the wireless receiver 205 receives the command page 145. At Step 645, the transceiver module 160 decodes the command page 145 and recognizes the instruction to acquire and transmit vend data.

At Step 647, the wireless transceiver 205 transmits a confirmation registration in the form of a packet, such as a 32-bit word acknowledging successful receipt and interpretation of the command page 147. At Step 650, the communication gateway 135 receives the confirmation registration and passes it to the data processing system 46. The GCP 510, which is one of the data processing system's programs 170 described above, accepts the confirmation registration and inserts it into an incoming registration table (not shown) for subsequent processing by the RPP 520, which is another one of the data processing programs 170. At Step 652, the RPP 520 attends to the confirmation registration's arrival and logs it as a record in a page log table (not shown).

At Step 655, illustrated on FIG. 6C, the transceiver module 160 interrogates the vending machine controller 165 by transmitting a request to communicate monitored data that the controller 165 has stored since its last service call. The vending machine controller 165 responds by providing this data in ASCII format as a serial bit stream.

At Step 657, the transceiver module 160 receives the vending machine's data from the controller 165 and parses the serial data stream to extract the requested operational data that has accumulated since the last time the vending machine 105 was reset, typically during its most recent restocking service call.

At Step 660, the transceiver module 160 reformats the parsed data and compresses it into 32-bit packets for transmission as binary coded decimal. At Step 665, the transceiver module's wireless transceiver 205 transmits the monitored data as multiple registrations 146 via the cellular network 130 to the communication gateway 135. That is, this data transmits in a control channel of the cellular network 130.

At Step 670, the communication gateway 135 receives each of the data registration packets. At Step 672, the GCP 510 accepts the operational data, still in the form of registration packets, and inserts this data into a table for subsequent attention by the RPP 520.

At Step 675, the RPP 520 recognizes that the tabulated data is responsive to the earlier request for data that was transmitted to the vending machine 105 at Step 630. The RPP 520 validates the incoming data and stores it in a file on the database 175 for subsequent processing by the VRGP 560, typically at a preset time or in response to a prompt by the bottler or other user.

At Step 677, the Internet 120 transmits this data to the PC-based GUI 180. At Step 680, the GUI displays raw, unprocessed, or processed vend data to the bottler. At Step 685, the bottler enters a request to process the data into the PC-based GUI 180. The bottler may request an alternate view of raw or processed data. The request entered at Step 685 initiates execution of Step 690, which is a process illustrated in FIG. 7 and discussed below that performs data processing and provides operational recommendations and other output. At Step 695, the PC-based GUI 180 displays the output from Step 690. Process 600 ends following Step 695.

Figure 7:
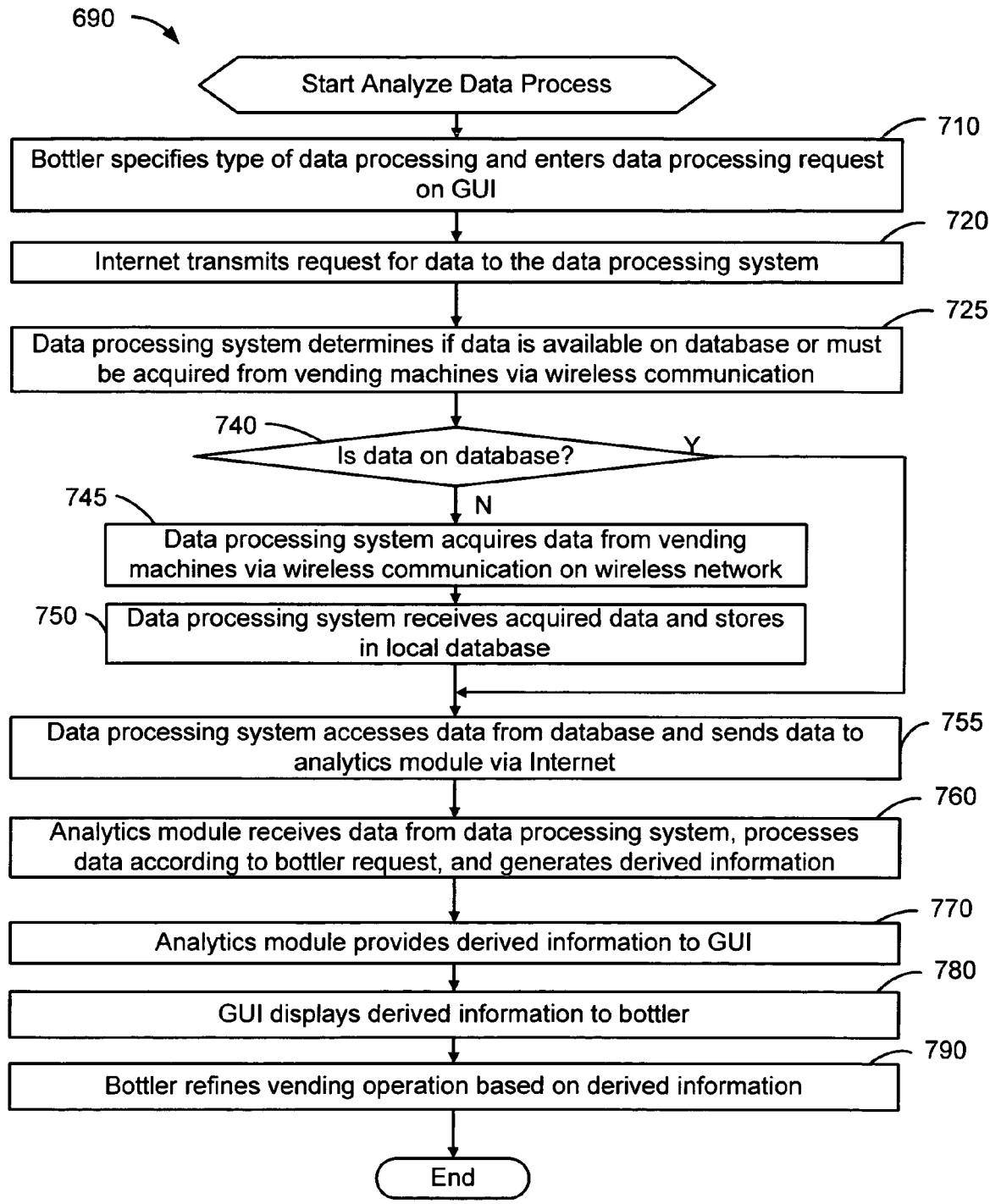
FIG. 7 illustrates a process for analyzing data acquired from a vending machine via a cellular network according to an exemplary embodiment of the present invention.

Turning now to FIG. 7, this figure illustrates a process 690, entitled Analyze Data, for analyzing data acquired from a vending machine 105 via a cellular network 130 according to an exemplary embodiment of the present invention. As discussed above, Process 690 can be a step 690 in Process 600.

At Step 710, the first step in Process 690, a bottler, having initiated execution of this process 690, specifies a type of data processing by making an entry into the PC-based GUI 180. The bottler may request a statistical analysis, a historically trend analysis, a correlation between acquired data sets, an operational recommendation intended to increase profitability, operational or hardware troubleshooting, inventory analysis, or sales analysis, for example. Process 800, Process 816, Process 900, Process 1000 and Process 1100, which are illustrated in FIGS. 8A, 8B, 9, 10 and 11 respectively and described below, further describe exemplary processes that a bottler or other user may request At Step 720, the Internet 120 transmits the bottler's request to the data processing system 46. After receipt of this request, the data processing system 46 determines if the bottler's request can be accommodated using the data available on the database 175 or if the request requires acquiring data from one or more vending machines 105 via the cellular network 130.

If the data is available on the database 175, inquiry Step 740 directs the processing flow of Process 690 to Step 755. If the data is not available, at Step 745 the data processing system 46 acquires the needed data from the appropriate vending machines 105 via wireless communication over the cellular network 130. At Step 750, following Step 745, the data processing system 46 receives the needed data and stores it in the database 175.

At Step 755, which executes following Step 750 or a positive determination at Step 740, the data processing system 46 accesses the data needed to accommodate the bottler's request from the database 175 and sends this data to the analytics module 185 over the Internet 120.

At Step 760, the analytics module 185 receives the sent data and processes it according to the bottler's request to generate data analysis results in the form of derived information. Derived information output by the analytics module 185 can include a sales forecast for one or more vending machines 105, identification of an operational pattern, or a recommended change to one or more vending machines 105, for example. Process 800, Process 816, Process 900, Process 1000, and Process 1100, which are illustrated in FIGS. 8A, 8B, 9, 10 and 11 respectively and described below, further describe exemplary derived information that a bottler may receive as output from the analytics module 185.

At Step 770, the analytics module 185 provides the derived information to the PC-based GUI 180 for display at Step 780. At Step 790, the bottler refines the vending operation of one or more vending machines 105 based on the derived information. Refining a vending operation can include implementing an operational change to a vending machine 105 via manual intervention, automatic or computer-based intervention, or a combination of manual and automatic intervention. Following Step 790, Process 690 ends.

Figure 8A:
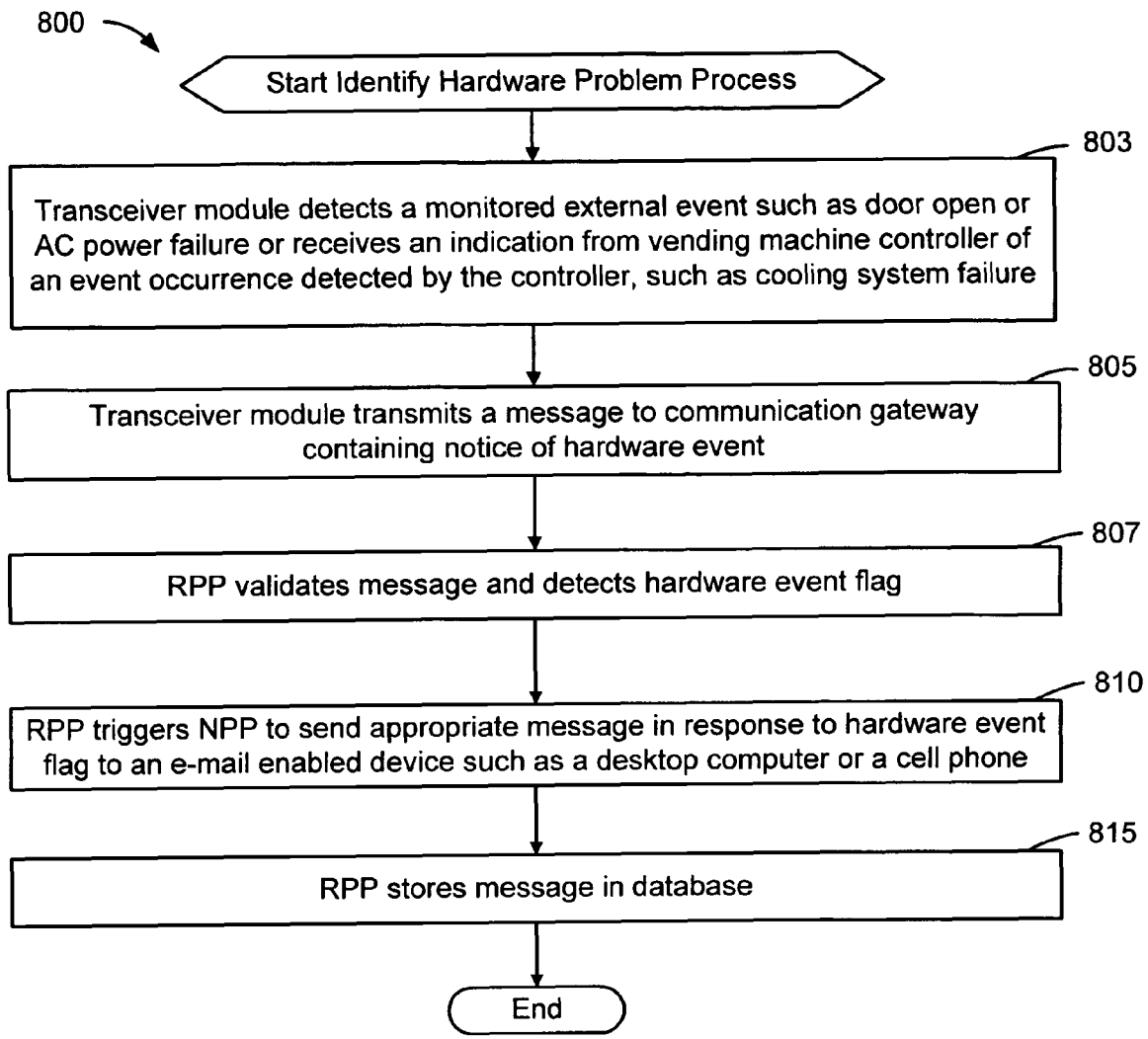
FIGS. 8A and 8B illustrate processes for identifying and responding to anomalous conditions based on data acquired from a vending machine via a cellular network according to an exemplary embodiment of the present invention.

Turning now to FIG. 8A, this figure illustrates a process, entitled Identify Hardware Problem, for identifying and responding to anomalous conditions based on data acquired from a vending machine 105 via a cellular network 130 according to an exemplary embodiment of the present invention.

At Step 803 in Process 800, the transceiver module 160 detects an external event that it directly monitors via a hardware sensor or receives an indication from the vending machine controller 165 of an event occurrence. The transceiver module's hardwired sensors can detect events or conditions such as an open door or an alternating current ("AC") power failure, while the vending machine controller 165 can provide notification of other conditions and events such as a cooling system failure.

At Step 805, the transceiver module 160 transmits a message to the communication gateway 135 that includes notification of the event in the form of a hardware flag. At Step 807, the RPP 520 validates the message and detects that a hardware flag in the message has been set, indicating occurrence of the event.

At Step 810, the RPP 520 triggers the NPP 530 to send an e-mail message that provides an alert of the event to designated personnel and/or devices. These personnel or devices may receive the message and its incorporated event notification via a desktop computer, cell phone, or other e-mail enabled communication device that has appropriate connectivity.

As an alternative to sending the e-mail alert or in conjunction with sending the e-mail alert, software operating on the data processing system 46 or on the web-based interface 125 can generate a control command or similar instruction in a message destined for the vending machine 105. The control command can address, change, or correct the event detected in Step 803 or an operational deviation such as a sales variation. The control command can be an instruction to acquire additional data from the vending machine 105 or a command to reset a system associated with the vending machine 105, such as an apparatus at the vending machine 105. The control command can also initialize or restart a microprocessor mounted at the vending machine 105, such as the microprocessor 210 in the transceiver module 160, a microprocessor in the vending machine controller 165, or a microprocessor associated with one of the vending machine systems 255. The control command can initialize or reboot software executing at the vending machine 105 for example triggering reloading and restarting firmware-based code. The message can also include a software patch for installing in a computer-based system of the vending machine 105. Such as software patch can be software that fixes a software problem or upgrades software to a new revision, for example.

At Step 815, the RPP 520 stores the message in the database 175 to facilitate subsequent analysis and to provide a historical log. Process 800 ends following Step 815.

Figure 8B:
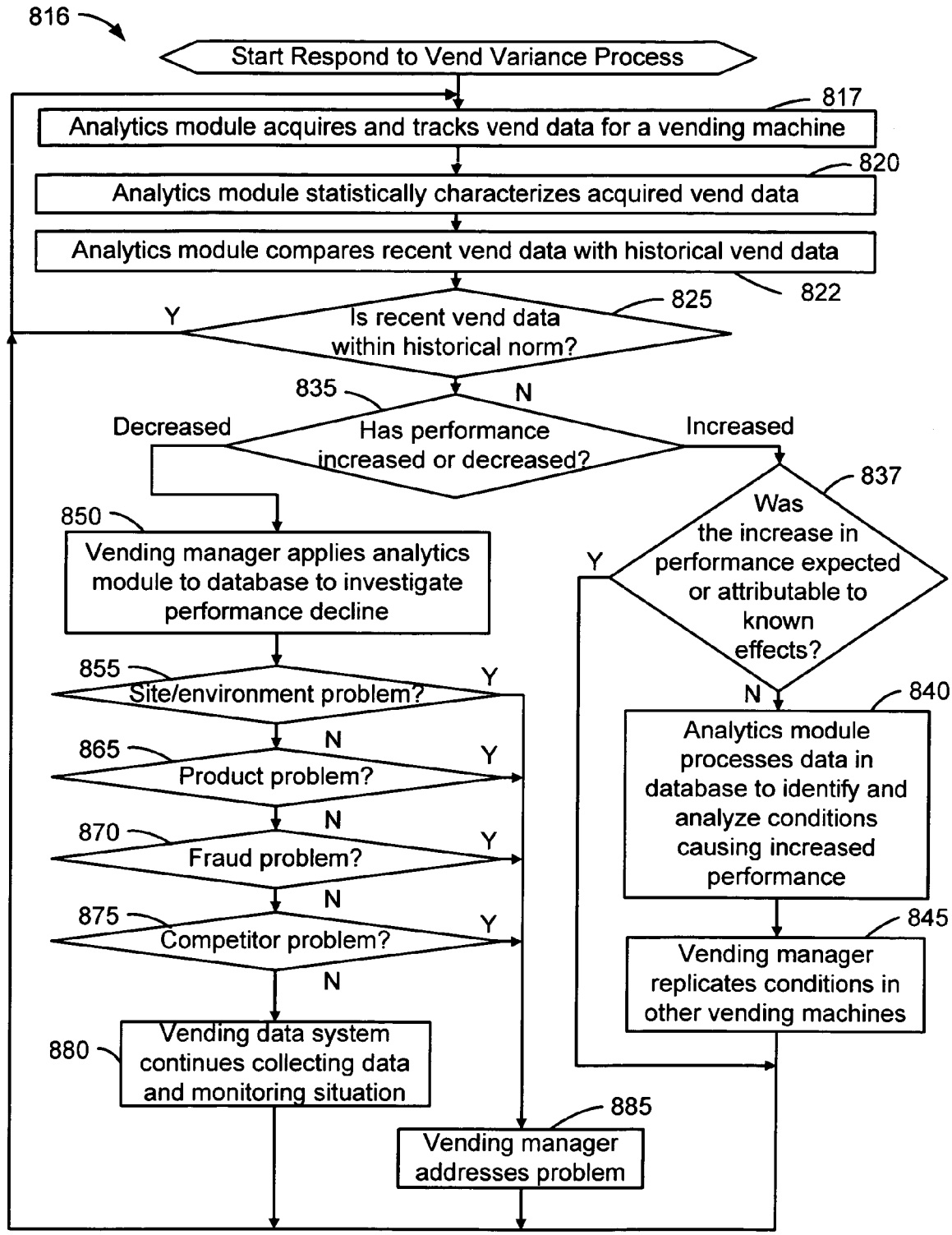

Turning now to FIG. 8B, this figure illustrate a process 816, entitled Respond to Vend Variance, for identifying and responding to anomalous conditions based on data acquired from a vending machine 105 via a cellular network 130 according to an exemplary embodiment of the present invention.

At Step 817, the analytics module 185 acquires and tracks vend data or other operational data from one or more vending machines 105. The analytics module 185 may undertake this activity in response to a prompt by a bottler or other user, as described above, or alternatively may act autonomously at a preset time, for example.

At Step 820, the analytics module 185 performs a statistical analysis on the acquired vend data, for example to identify a statistical pattern in the data. At Step 822, the analytics module 185 compares recent data with historical data as one or more steps of the statistical analysis.

At inquiry Step 825, the analytics module 185 determines if recent data is within historical norm. In other words, the statistical analysis includes checking to see if the acquired data indicates a recent change in operations of the vending machine 105. If the analysis indicates that the vending machine 105 is operating within its normal pattern of operation, then Process 816 iterates Steps 817, 820, and 822 and continues acquiring, tracking, and analyzing vending data. If the analysis indicates that the vending machine 105 has undergone a recent operational change, then inquiry Step 835 directs the processing flow of Process 816 depending on whether performance of the vending machine 105 has increased or decreased.

If recent performance has decreased, Step 850 follows Step 835. Conversely, if performance has increased, then inquiry Step 837 follows Step 835 and determines if the increase was expected or attributable to a known cause. A variation in performance may be due to a marketing test, a routine seasonable variation, or an expected departure of a competitor from a geographical market, for example. If the performance increase was expected, then the flow of Process 816 loops back to Step 817 and the acquisition, tracking, and analysis of vending data continues. If the performance increase was unexpected, then at Step 840, the analytics module 185 processes data accumulated in the database 175 to ascertain the conditions causing the increase and to conduct analysis on such conditions.

At Step 845, the vending manager, such as a manager employed by a soft drink bottler, replicates in other vending machines 105 the conditions that caused the increase. In other words, knowing the cause of one vending machine's heightened sales, profitability, or other performance metric, the operator of a system of vending machines 105 can subject other vending machines 105 to these causes. If multiple conditions contribute to the increase, the vending manager can control operations based on a single condition selected on the PC-based GUI 180.

If analysis at Step 835 determines that performance has decreased rather than increased, then at Step 850 the vending manager applies the processing capabilities of the analytics module 185 to the database 175 to investigate the cause of the performance decline.

At inquiry Step 855 the vending manager determines if the vending machine 105 has a site or environmental problem. To make this determination, the vending manager may conduct an analysis using the analytics module 185 to compare operational results from multiple machines believed to operate in similar sites or under similar environmental conditions. The vending manager may also send personnel to the vending machine site to investigate site conditions. If a site or environmental problem is identified, then at Step 885 the vending manager addresses the problem and Steps 817, 820, and 822 continue collecting wireless data and conducting data analysis.

In one exemplary embodiment of the present invention, at Step 885 software operating on the data processing system 46 or on the web-based interface 125 generates a control command or similar instruction in a message that is transmitted to the vending machine 105. The vending manager can be involved, for example authorizing or requesting the control command transmission. Alternatively, such software can automatically initiate sending this message in an attempt to address or correct a problem without human intervention.

Such a control command can be responsive to an operational deviation such as a sales variation. The control command can include an instruction to acquire additional data or fresh data from the vending machine 105 or a command to reset a system associated with the vending machine 105, such as an apparatus at the vending machine 105. The control command can also initialize or restart a microprocessor mounted at the vending machine 105, such as the microprocessor 210 in the transceiver module 160, a microprocessor of the vending machine controller 165, or a microprocessor associated with one of the vending machine systems 255. The control command can initialize or reboot software executing at the vending machine 105 for example triggering reloading and restarting firmware-based code.

If no problem is identified at Step 855, then Step 865 follows Step 855. At Step 865 the vending manager uses the analytics module 185 to determine if a product problem is responsible for the decreased performance. Stocking an outdoor vending machine with a hot-weather sports drink in a winter season is an example of a product problem. If the vending manager attributes the problem to a product problem, then the problem is addressed at Step 885, otherwise Step 870 follows Step 865.

At Step 870, the vending manager uses the analytics module 185 to determine if a fraud problem is the potential cause of the vending machine's performance decline. To uncover a fraud problem, the analytics module 185 can determine if inventory has been depleted in an erratic pattern, if the door of the vending machine 105 has been opened at an inappropriate time, or if inventory changes do not match cash collections, for example. If analysis indicates a fraud problem, the vending manager can address the problem at Step 885 by disciplining the responsible party or changing the lock on the vending machine 105, for example.

If the vending manager does not identify a fraud problem at Step 870, then at Step 875 the vending manager uses the analytics module 185 to help determine if a competitive product is responsible for the problem. For example, the analytics module 185 may determine that sales of a specific soft drink have decreased across a bottler's system of geographically dispersed vending machines 105. With this information, the vending manager may research the activities of other bottlers known to have products that compete with the soft drink. If the vending manager determines that the decrease is due to competitive activity, the manager may address this condition at Step 885, for example initiating a defensive advertising campaign.

If the vending manager is unable to determine the cause of the decrease in performance in any of Steps 855-875, then iterating Steps 817, 820, and 822 continues the process steps of collecting and analyzing data from vending machines 105. And, Steps 855-875 continue troubleshooting until sufficient information is available to isolate a cause or until performance returns to a historical norm.

Figure 9:
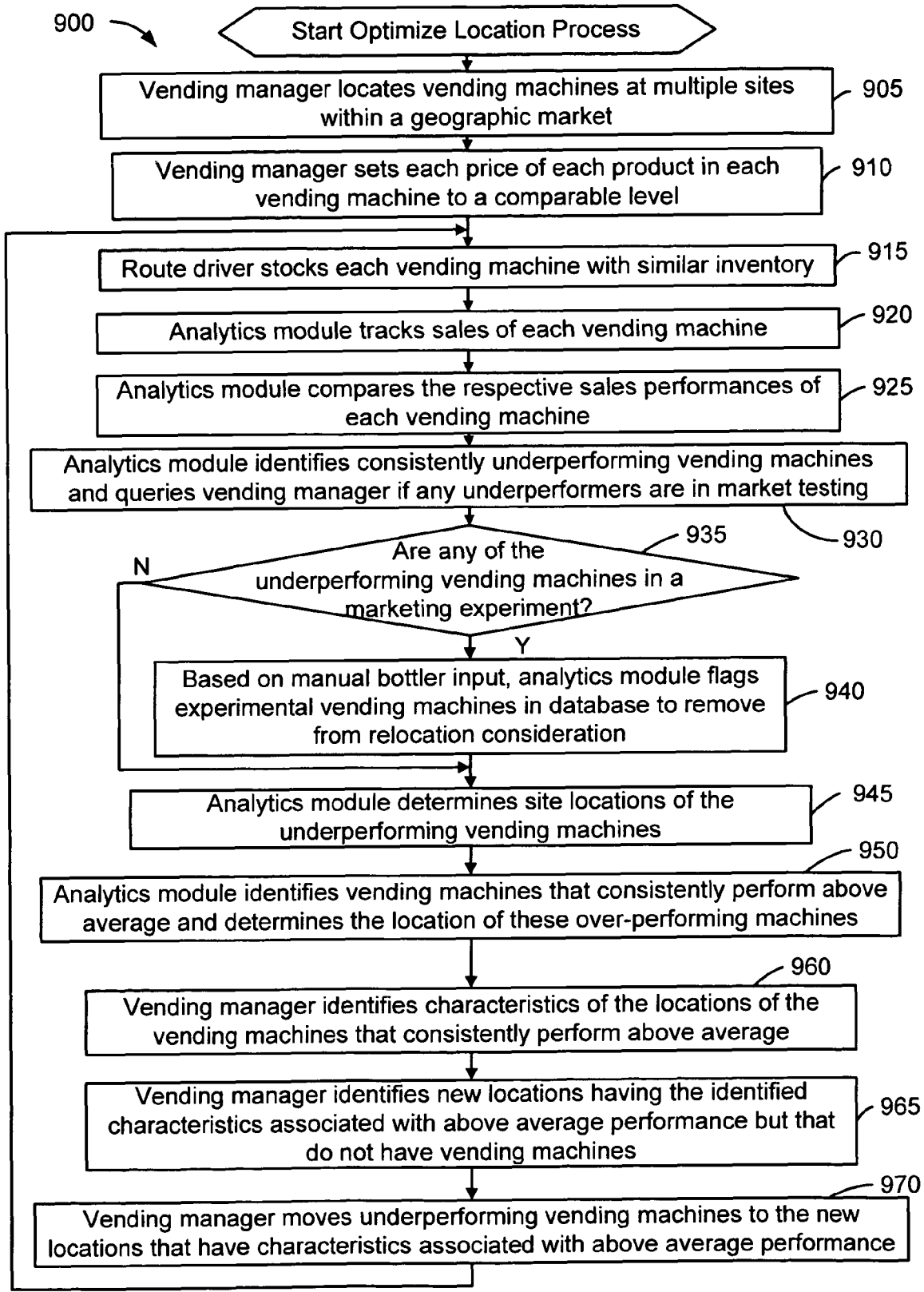
FIG. 9 illustrates a process for optimizing vending machine locations based on data acquired from vending machines via a cellular network according to an exemplary embodiment of the present invention.

Turning now to FIG. 9, this figure illustrates a process 900, entitled Optimize Location, for optimizing vending machine locations based on data acquired from vending machines 105 via a cellular network 130 according to an exemplary embodiment of the present invention.

At Step 905, the first step in Process 900, a vending manager, such as manager at a soft drink bottler, locates vending machines 105 at a plurality of sites dispersed within a geographic market such as a metropolitan area, neighborhood, community, or state.

At Step 910, the vending manager sets prices for the products in each of the vending machines 105 to a comparable level. While the prices of each product in each vending machine 105 may be identical, the prices may alternatively be adjusted according to location, product brand, or other factors.

At Step 915, a route driver stocks each vending machine 105 with the same inventory or with an inventory that is sufficiently similar to facilitate an operational comparison between at least two vending machines 105. A subset of the total vending machines 105 operated by a bottler may have the same products selections, the same inventory, and the same prices, for example. In one exemplary embodiment of the present invention, the inventories of two vending machines 105 that are undergoing an operational comparison have both common product offerings and distinct product offerings.

At Step 920 the analytics module 185, in collaboration with the other components of the vending management system 100, tracks sales of each of the vending machines 105 that have comparable product prices and inventories. At Step 925, the analytics module 185 compares the respective sales performance of each of the tracked vending machines 105. At Step 930, the analytics module 185 identifies tracked vending machines 105 that exhibit a sustained or statistically significant pattern of lower sales performance than other tracked vending machines 105. The analytics module 185 queries the vending manager to determine if any of the underperforming vending machines 105 are in a marketing experiment or have been purposely subjected to another imposed condition impacting performance.

Inquiry Step 935 skips Step 940 and branches to Step 945 if a marketing experiment or other imposed condition did not cause the underperformance. At Step 940, the analytics module 185 flags the underperforming vending machines 105 that are known to be subject to a marketing experiment or other imposed condition, thereby eliminating them from relocation consideration.

At Step 945, following either a negative determination at Step 935 or Step 940, the analytics module 185 determines the locations of the underperforming vending machines 105 that were not flagged in Step 940.

At Step 950, the analytics module 185 identifies vending machines 105 that consistently outperform other tracked vending machines 105. At Step 960, the vending manager identifies characteristics of the site locations of these outperforming vending machines 105. Exemplary characteristics of such locations may be proximity to a sports arena, park, or shade tree; situation in a building lobby or busy hallway; customer demographic pattern; or other factor revealed by human or computer analysis.

At Step 965, the vending manager identifies new locations that have similar characteristics to those identified in Step 960 but that do not have preexisting access to vending machine service. In other words, the vending manager identifies sites that are underserved by vending machine operations but that have characteristics believed to be conducive to profit generation. Step 965 can proceed with manual site visits or with computer based analysis of candidate sites. At Step 970, in anticipation of higher performance, the vending manager moves the underperforming vending machines 105 to the new locations identified at Step 965. Following Step 965, Process 900 returns to Step 915 and the above described steps of servicing vending machines 105, tracking performance, and optimizing vending locations continues.

Figure 10:
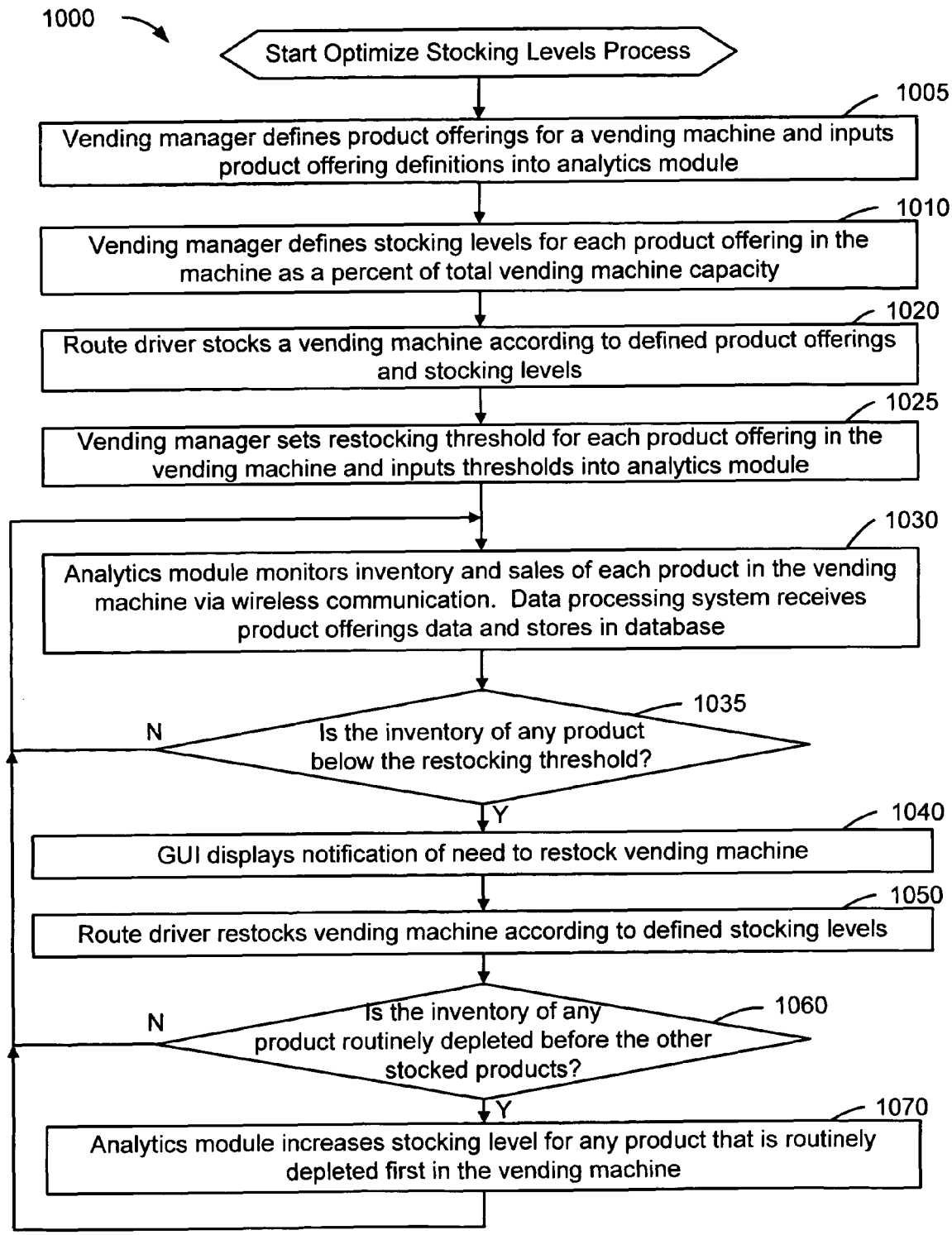
FIG. 10 illustrates a process for optimizing stocking levels of a vending machine based on data acquired from vending machines via a cellular network according to an exemplary embodiment of the present invention.

Turning now to FIG. 10, this figure illustrates a process 1000, entitled Optimize Stocking Levels, for optimizing stocking levels of a vending machine 105 based on data acquired from vending machines 105 via a cellular network 130 according to an exemplary embodiment of the present invention. While discussed below with reference to one vending machine 105, Process 1000 is applicable to each vending machine 105 in a system of vending machines that are operated by an operator such as a beverage bottler.

At Step 1005, the first step in Process 1000, the vending manager defines product offerings for a vending machine 105 and inputs these product offerings into the analytics module 185.

At Step 1010, the vending manager defines stocking levels for each product offering in the vending machine 105. In other words, the vending manager dedicates a fraction of the vending machine's total product storage capacity to each of the products that the vending machine 105 offers for purchase. At Step 1020, a route driver stocks the vending machine 105 according to the defined stocking levels for each product offering.

At Step 1025, the vending manager establishes restocking thresholds for each product offering in the vending machine 105 and inputs these thresholds into the analytics module 185 using the PC-based GUI 180. A restocking threshold is an inventory level that triggers replenishing the vending machine's inventory. For example, a fully stocked vending machine 105 might have an inventory of fifty cans of a specific soft drink, and the restocking threshold might be ten cans. In this example, depleting the inventory of this soft drink below ten cans would initiate sending a driver to restock the vending machine 105. The restocking threshold or trigger can be set based on a percentage of a single stock keeping unit that is sold or a percentage of the machine vending machine's total capacity. Criteria for restocking can also include a fixed schedule or a number of days since the last onsite visit to the machine, for example.

At Step 1030 the analytics module 185, via the other components of the vending management system 100, monitors inventory and sales of the vending machine's products. The data processing system 170 stores the acquired data in the database 175. At inquiry Step 1035, the VRGP 560 determines if the inventory of any of the stocked products has crossed under, or has become less than, the restocking threshold. If the inventory has not depleted below the restocking threshold, then Process 1000 iterates Step 1030 until the threshold is crossed. When the threshold is crossed, Process 1000 executes Step 1040 and the VRGP 560 posts notification on the PC-based GUI 180 that the vending machine 105 needs to be restocked.

At Step 1050, a route driver responds to the posted notification and restocks the vending machine 105. At Step 1060, the analytics module 185 determines if any of the vending machine's products are regularly or routinely depleted before the other products. In other words, the analytics module 185 identifies any products that sell at a rate that triggers a restock more frequently than other products. If the analytics module 185 does not identify a stocked product exhibiting a sales pattern that causes a restocking intervention more frequently than other stocked products, then Process 1000 loops back and executes Step 1030 and the following steps.

If the analytics module 185 identifies a product that is responsible for a disproportionate number of restocking interventions, then at Step 1070, the analytics module 185 increases the stocking level of that product. In other words, the analytics module 185 increases the fraction of the vending machine's total inventory capacity that is dedicated to a product that sells at a rate that prematurely depletes inventory. The analytics module 185 can calculate and provide a percent variation between an amount of product stock keeping unit sold and the capacity associated with that stock keeping unit, for example. The analytics module 185 can provide a suggestion for adjusting a stocking level to support an increase in sales. Following Step 1070, Process 1000 loops back to Step 1030 and proceeds with that step 1030.

Figure 11:
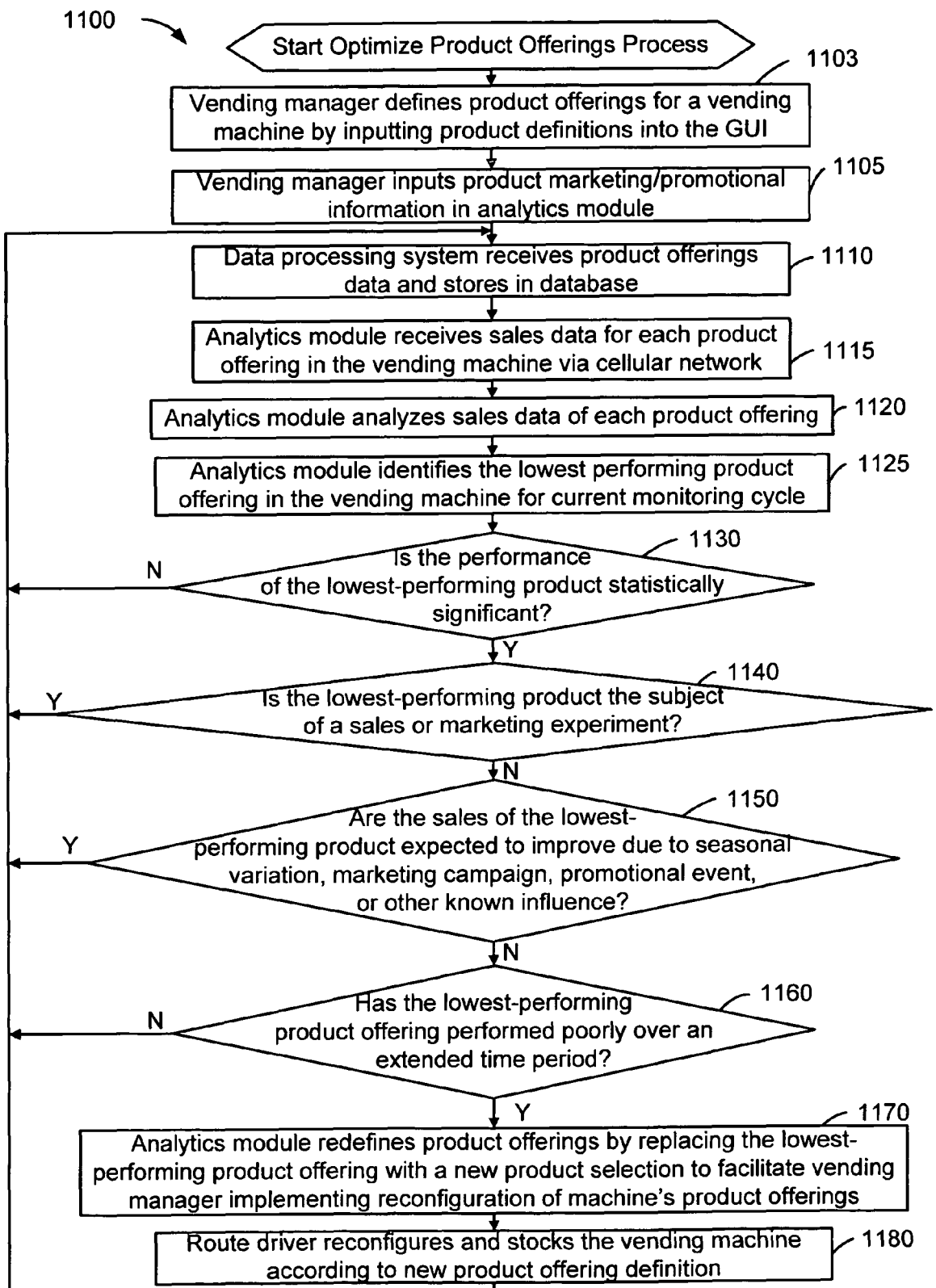
FIG. 11 illustrates a process for optimizing product offerings of a vending machine based on data acquired from vending machines via a cellular network according to an exemplary embodiment of the present invention.

Turning now to FIG. 11, this figure illustrates a process 1100, entitled Optimize Product Offerings, for optimizing product offerings of a vending machine 105 based on data acquired from vending machines 105 via a cellular network 130 according to an exemplary embodiment of the present invention. While discussed below with reference to one vending machine 105, Process 1100 is applicable to each vending machine 105 in a system of vending machines 105 that are operated by an operator such as a beverage bottler. A bottler can iterate Process 1100 for each vending machine 105 in a system of geographically dispersed vending machines 105. In one exemplary embodiment of the present invention, the illustrated steps in Process 1100 analyze or process information collected from two or more vending machine 105 operated by a common organization.

At Step 1103, the first step in Process 1100, a vending manager defines product offerings for a vending machine 105 and inputs these initial product offering definitions into the PC-based GUI 180.

At Step 1105, the vending manager inputs product marketing and promotional information into the analytics module 185 to provide notification of activities that could impact product or brand sales. The manager can further notify the analytics module 185 of any other imposed or known conditions expected to impact product sales or that are pertinent to optimizing the vending machine's product offerings.

At Step 1110, the data processing system 46 receives the input product offerings data from the PC-based GUI 180 and stores this data in the database 175 where it is accessible by the analytics module 185. At Step 1115, the analytics module 185 receives sales data for each product offering in the vending machine 105. This sales data is acquired via the cellular network 130 and is stored in the database 175 for analytics module access.

At Step 1120, the analytics module 185 conducts an analysis on the acquired sales data for each product that the vending machine 105 offers. The analysis includes identifying the vending machine's lowest selling and/or least profitable product. In conjunction with this analysis, the analytics module 185 determines at inquiry Step 1130 if relative performance of the lowest-performing product is statistically significant. If the analysis determines that the differences between performances of the vending machine's products is not statistically significant, then Process 1100 loops back to Step 1110 and monitoring and analysis continues.

If the performance difference is statistically significant, then at inquiry Step 1140 the analytics module 185 determines if the lowest-performing product is the subject of a marketing experiment, test condition, or other factor identified at Step 1105 with the potential to adversely impact sales performance. If the determination of Step 1140 is positive, Process 1100 loops back to Step 1110.

If the determination of Step 1140 is negative, at inquiry Step 1150, the analytics module 185 determines if sales of the lowest-performing product can be forecast to improve, for example due to a planned marketing campaign, a change of season, or other known influence. If such forecast indicates that the product's sales might improve, then Process 1100 loops back to Step 1110.

If sales improvement is not anticipated, then at inquiry Step 1160, the analytics module 185 determines if the lowest-performing product has performed poorly in the vending machine 105 for an extended period of time. In other words, the analytics module 185 investigates the possibility that the condition of poor performance is an irregularity or anomaly. If the analytics module 185 determines that the product has exhibited a long-term or recurring pattern of poor performance, then Step 1170 follows Step 1160. Otherwise, Process 1100 loops back to Step 1110 and does not recommend or implement a change to the vending machine's product selections in the current iteration of process steps.

At Step 1170, the analytics module 185 redefines the product offerings by replacing the lowest-performing product offering with a new product selection. The new product selection can be a product that the analytics module 185 identifies as a strong performer in other vending machines 105, for example. While this output can be a recommendation to the vending manager, in one exemplary embodiment of the present invention, the identified new product is automatically implemented as a directive. At Step 1180 a route driver reconfigures the vending machine 105 according to the new product definition. Following Step 1180, Process 1100 loops back to Step 1110 and continues monitoring and analysis to optimize the vending machine's product offerings.

In summary, the present invention can refine the operations of one or more vending machines in a system of geographically dispersed vending machines by collecting timely operational data from vending machines via wireless communication and generating recommendations for operational adjustments through processing the collected information with a computer system.

From the foregoing, it will be appreciated that the present invention overcomes the limitations of the prior art. From the description of the embodiments, equivalents of the elements shown therein will suggest themselves to those skilled in the art, and ways of constructing other embodiments of the present invention will suggest themselves to practitioners of the art. Therefore, the scope of the present invention is to be limited only by the claims below.

What is claimed is:

1. A computer-based method for adjusting operations of one vending machine in a plurality of geographically dispersed vending machines linked to a data processing center via a wireless data communication system, comprising the steps of:

receiving operational data from each geographically dispersed vending machine at the data processing center via the wireless data communication system;

processing the operational data by a computer at the data processing center;

identifying by the computer an underperforming vending machine in the plurality of vending machines that exhibits lower sales than the other geographically dispersed vending machines by comparing the sales of the geographically dispersed vending machines against one another;

determining by the computer at least one condition contributing to the lower sales for the underperforming vending machine;

analyzing by the computer market data at the data processing center to determine if at least one condition contributing to lower sales is related to the location of the underperforming vending machine; and when at least one condition is related to the location of the underperforming vending machine, generating by the computer one or more characteristics related to a geographical location where the underperforming vending machine may be relocated.

2. The method of claim 1, wherein the plurality of vending machines are operative to vend soft drinks.

3. The method of claim 1, further comprising the step of, when the one condition is not related to the location of the underperforming vending machine, varying by the computer the at least one condition for the underperforming vending machine.

4. The method of claim 3, wherein:

determining the at least one condition contributing to the lower sales for the underperforming vending machine comprises identifying a first condition and a second condition, each contributing to the lower sales; and the varying step comprises varying a select one of the first condition and the second condition based on managerial input.

5. The method of claim 4, further comprising the step of inputting the managerial input at a remote interface and transmitting the managerial input via the Internet to the data processing center.

6. The method of claim 3, wherein:

determining the at least one condition contributing to the lower sales comprises identifying an imposed condition and a variable condition, each contributing to the lower sales; and the varying step comprises varying the variable condition.

7. The method of claim 6, wherein the imposed condition comprises a market experiment.

8. The method of claim 3, wherein:

the at least one condition comprises an environmental condition of the underperforming vending machine; and the varying step comprises relocating the underperforming vending machine to a location providing at least some aspect of the environmental condition.

9. The method of claim 3, wherein:
processing the operational data comprises statistically analyzing historical data.

10. The method of claim 3, further comprising the step of sending a message comprising a request for the operational data, to each vending machine in the plurality of vending machines.

11. The method of claim 3, wherein the step of varying the at least one condition for the underperforming vending machine comprises automatically transmitting a control command to the underperforming vending machine.

12. The method of claim 11, wherein the control command is transmitted to the underperforming vending machine over a wireless network.

13. The method of claim 11, wherein the control command comprises a command to acquire data from the underperforming vending machine.

14. The method of claim 11, wherein the control command comprises an instruction to reset an apparatus of the underperforming vending machine.

15. The method of claim 11, wherein the control command comprises an instruction to initialize a microprocessor mounted at the underperforming vending machine.

16. The method of claim 11, wherein the control command initializes software executing at the underperforming vending machine.

17. The method of claim 1, further comprising the step of relocating the underperforming vending machine to a new geographic location.

18. The method of claim 17, wherein the underperforming vending machine is relocated to a new geographic location comprising one or more of the generated characteristics.

19. The method of claim 1, wherein the one or more characteristics comprises a characteristic related to one of the geographically dispersed vending machines that is not underperforming.

20. The method of claim 1, wherein the one or more characteristics comprises a characteristic related to one of the geographically dispersed vending machines that is over-performing.

21. The method of claim 1, wherein the one or more characteristics is proximity of a vending machine to a sports arena.

22. A method for managing operations of a vending machine in a plurality of geographically dispersed vending machines comprising:
sending a request for vending data to the vending machine;
receiving the vending data at a data processing system;
aggregating the vending data at the data processing system with additional vending data received from at least one other vending machine;
processing by a computer the aggregated vending data at the data processing system;
identifying by the computer an operational deviation between the vending machine and the at least one other vending machine by comparing the sales of the vending machines against one another, the operational deviation indicating that the vending machine is underperforming in comparison to other ones of the plurality of geographically dispersed vending machines;
analyzing by the computer market data to determine if the operational deviation is related to the location of the vending machine; and
when the operational deviation is related to the location of the vending machine, generating by the computer one or more characteristics related to a geographical location where the underperforming vending machine may be relocated; and
when the operational deviation is not related to the location of the vending machine, automatically transmitting by the computer a control command to the vending machine in response to identifying the operational deviation for the vending machine.

23. The method of claim 22, wherein transmitting the control command comprises transmitting the control command to the vending machine using a wireless data communication system.

24. The method of claim 22, wherein transmitting the control command comprises sending a telemetry message.

25. The method of claim 22, wherein the operational deviation comprises a difference in sales.

26. The method of claim 22, wherein the control command comprises a command to acquire data from the vending machine.

27. The method of claim 22, wherein the control command comprises an instruction to reset an apparatus of the vending machine.

28. The method of claim 22, wherein the control command comprises an instruction to initialize a microprocessor mounted at the vending machine.

29. The method of claim 22, wherein the control command initializes software executing at the vending machine.

30. The method of claim 22, wherein:
managing operations of the vending machine comprises managing operations of the plurality of vending machines;
the sending step comprises:
generating the request for vending data;
replicating the request for each vending machine in the plurality of vending machines;
addressing each replicated request to a respective vending machine in the plurality of vending machines;
placing each addressed request in a queue; and
sending each of the queued requests over a wireless data communication system to each respective vending machine in the plurality of vending machines in an order based on queue position;
the receiving step comprises receiving the requested vending data from each respective vending machine in the plurality of vending machines;
the processing step comprises comparing the received vending data between each respective vending machine in the plurality of vending machines to identify the operation deviation, occurring between the vending machine and the at least one other vending machine; and
the transmitting step comprises transmitting the control command to the vending machine.

31. The method of claim 22, wherein the control command comprises a software patch.

32. The method of claim 22, further comprising the step of relocating the vending machine to a new geographical location to promote increased sales of the underperforming vending machine.

33. The method of claim 32, wherein the underperforming vending machine is relocated to a new geographic location comprising one or more of the generated characteristics.

* * * * *